(12) United States Patent
Tsujimoto et al.

(10) Patent No.: US 10,535,363 B2
(45) Date of Patent: Jan. 14, 2020

(54) AUDIO PROCESSING APPARATUS AND CONTROL METHOD THEREOF

(71) Applicant: CANON KABUSHIKI KAISHA, Tokyo (JP)

(72) Inventors: Yuki Tsujimoto, Tokyo (JP); Keita Sonoda, Yokohama (JP); Ryosuke Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/995,332

(22) Filed: Jun. 1, 2018

(65) Prior Publication Data
US 2018/0350385 A1 Dec. 6, 2018

(30) Foreign Application Priority Data
Jun. 5, 2017 (JP) .................. 2017-111161

(51) Int. Cl.
*H04B 15/00* (2006.01)
*G10L 21/0232* (2013.01)
*H04N 5/911* (2006.01)
*H04N 5/77* (2006.01)
*G10L 21/0216* (2013.01)

(52) U.S. Cl.
CPC ......... *G10L 21/0232* (2013.01); *H04N 5/772* (2013.01); *H04N 5/911* (2013.01); *G10L 2021/02165* (2013.01)

(58) Field of Classification Search
CPC .......... G10K 2210/1051; G10K 11/178; G10L 21/0232; H04N 5/772; H04N 5/911; H04N 9/802; H04N 9/8042

USPC .............. 381/122, 71.8, 71.3, 92, 94.1–94.3; 348/231.4
See application file for complete search history.

(56) References Cited

U.S. PATENT DOCUMENTS

2012/0162471 A1* 6/2012 Sekiya ................ G10L 21/0208
348/231.4

FOREIGN PATENT DOCUMENTS

| JP | 2006-279185 A | 10/2006 |
| JP | 2011-114465 A | 6/2011 |

* cited by examiner

*Primary Examiner* — Vivian C Chin
*Assistant Examiner* — Ammar T Hamid
(74) *Attorney, Agent, or Firm* — Cowan, Liebowitz & Latman, P.C.

(57) ABSTRACT

An audio processing apparatus includes a transform unit that transforms time series audio data obtained from first and second microphones into first and second frequency spectrum data; a driving noise computation processing unit that computes a subtraction amount of the driving noise for each of frequencies from the first and second frequency spectrum data obtained by the transform unit; a generating unit that, on the basis of the first and the second frequency spectrum data obtained by the transform unit and the driving noise subtraction amount obtained by the driving noise computation processing unit, generates left and right channel frequency spectrum data in which the driving noise is respectively suppressed; and an inverse transform unit that inverse-transforms the left and right channel frequency spectrum data generated by the generating unit into left and right channel time series audio data, respectively.

17 Claims, 21 Drawing Sheets

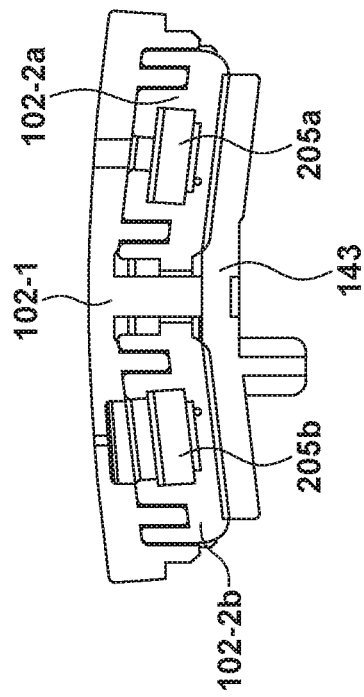
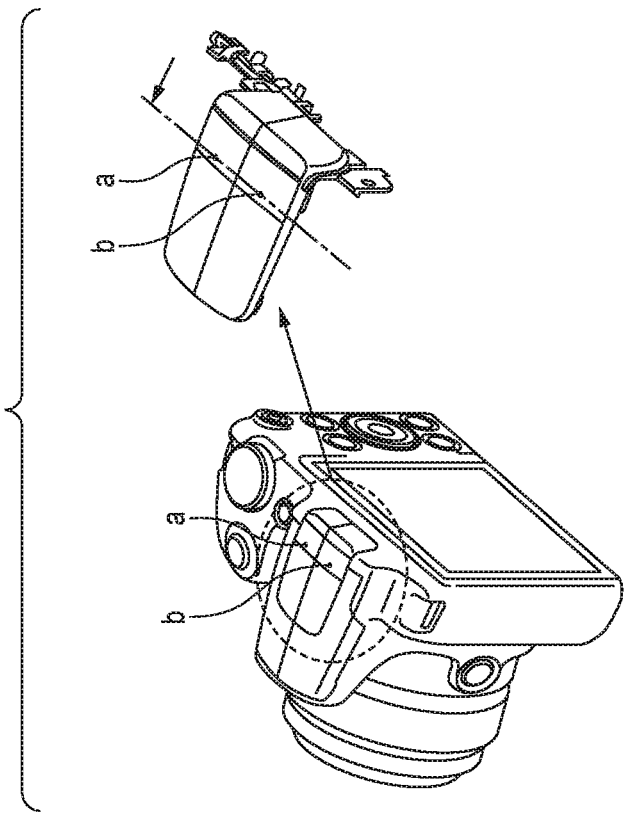
FIG. 3A
FIG. 3B

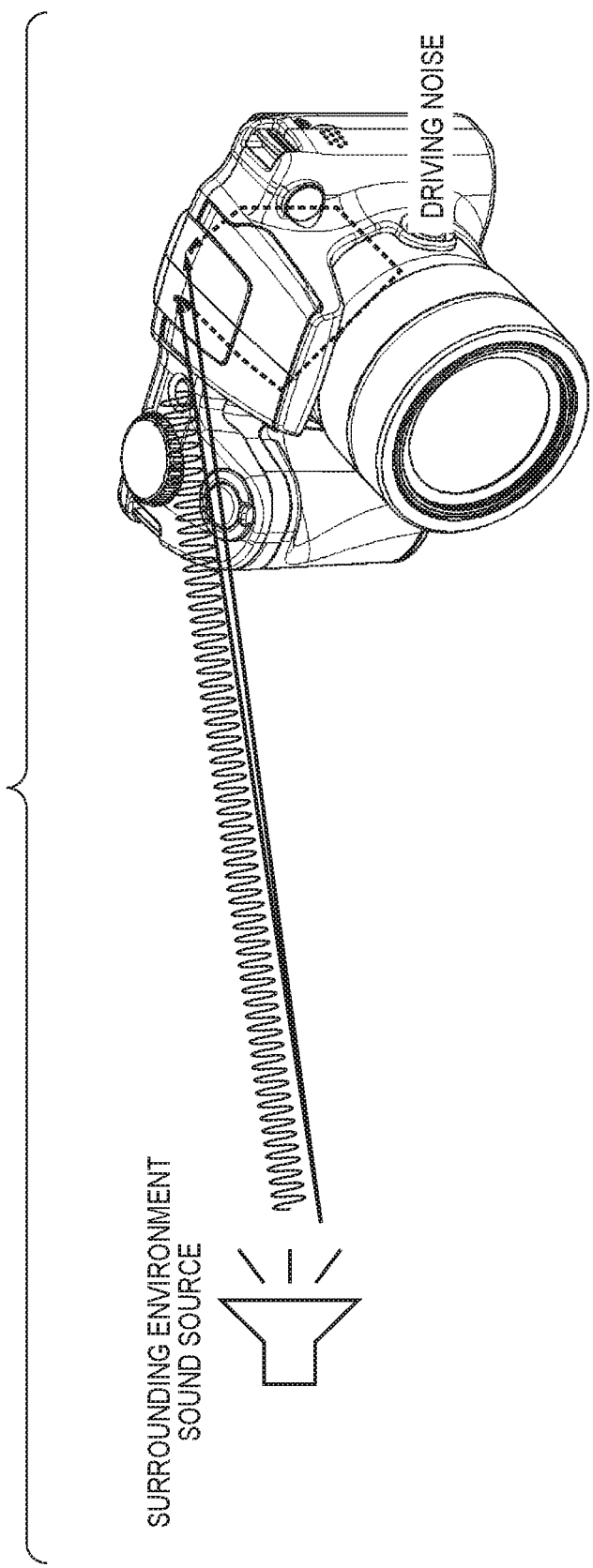

FIG. 8A  WHEN SURROUNDING ENVIRONMENT SOUND COMES FROM MAIN MICROPHONE SIDE (RIGHT SIDE)
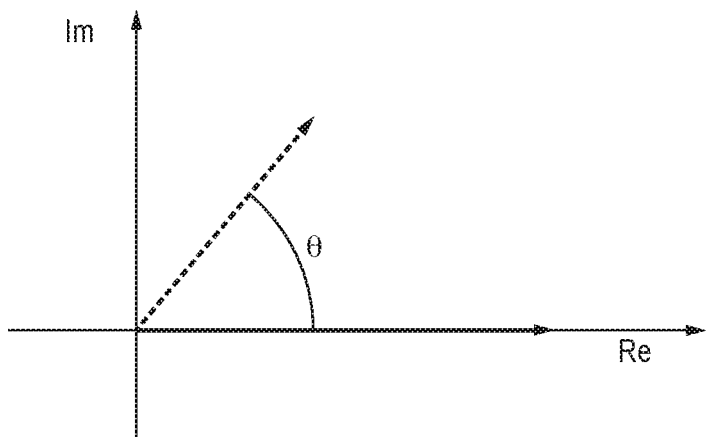
FIG. 8B  WHEN SURROUNDING ENVIRONMENT SOUND COMES FROM SUB MICROPHONE SIDE (LEFT SIDE)
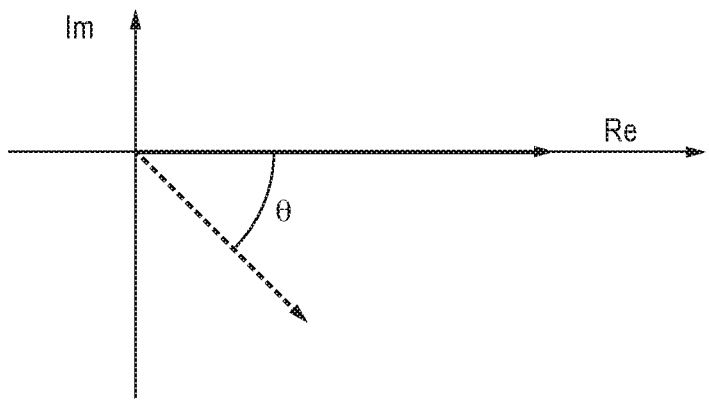
FIG. 8C  WHEN SURROUNDING ENVIRONMENT SOUND COMES FROM OPTICAL AXIS CENTER
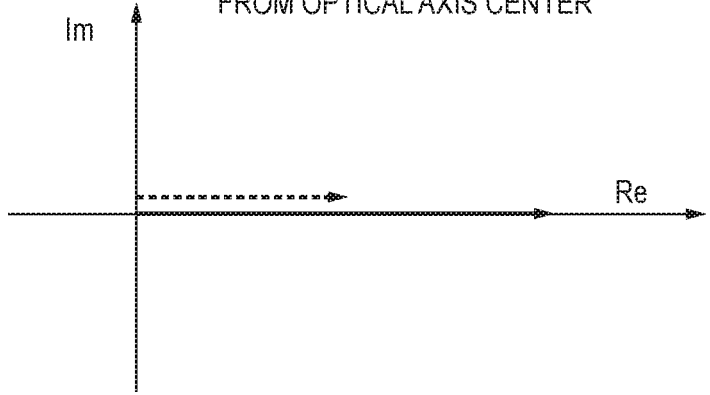

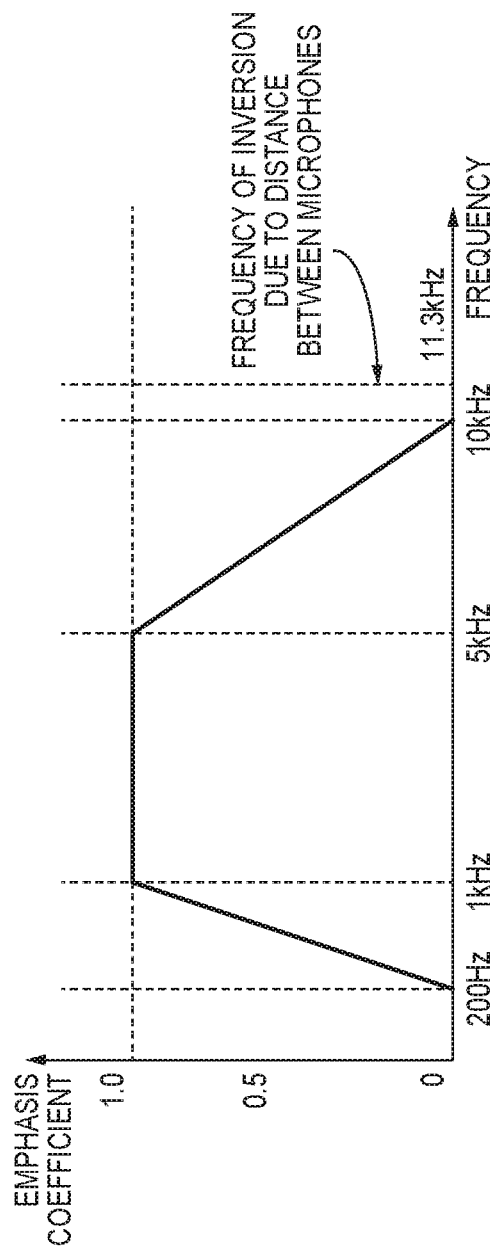

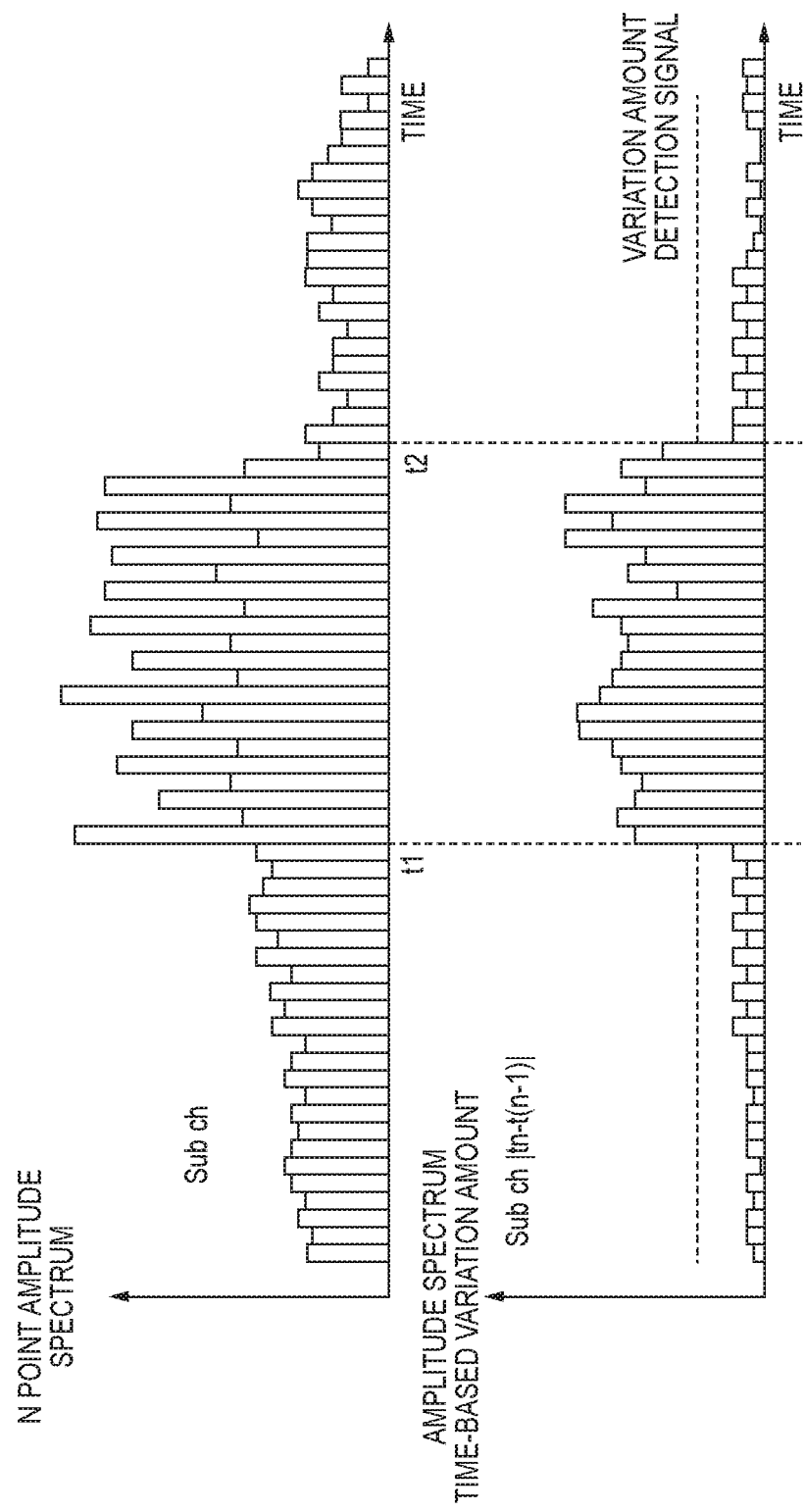

SURROUNDING ENVIRONMENT SOUND

DRIVING NOISE

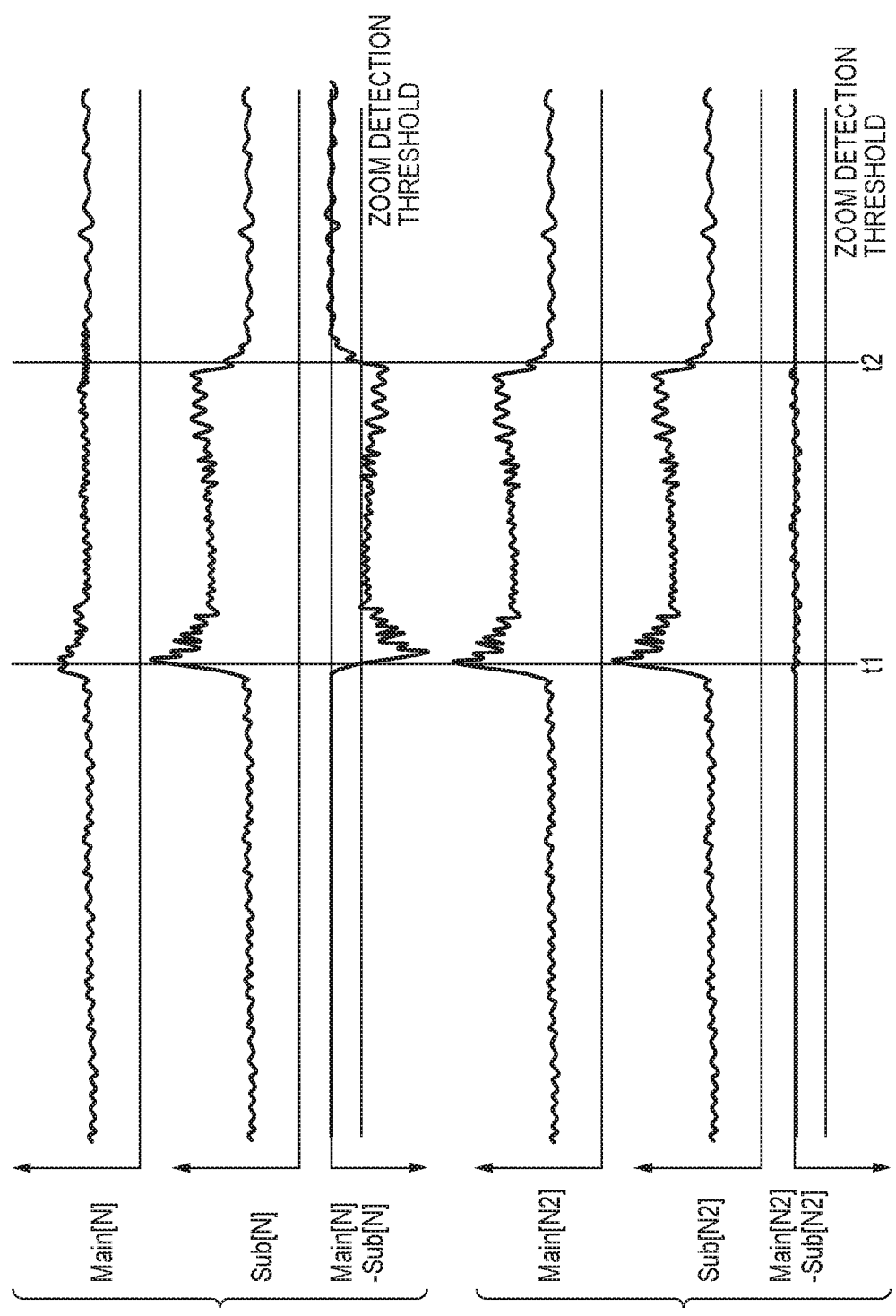

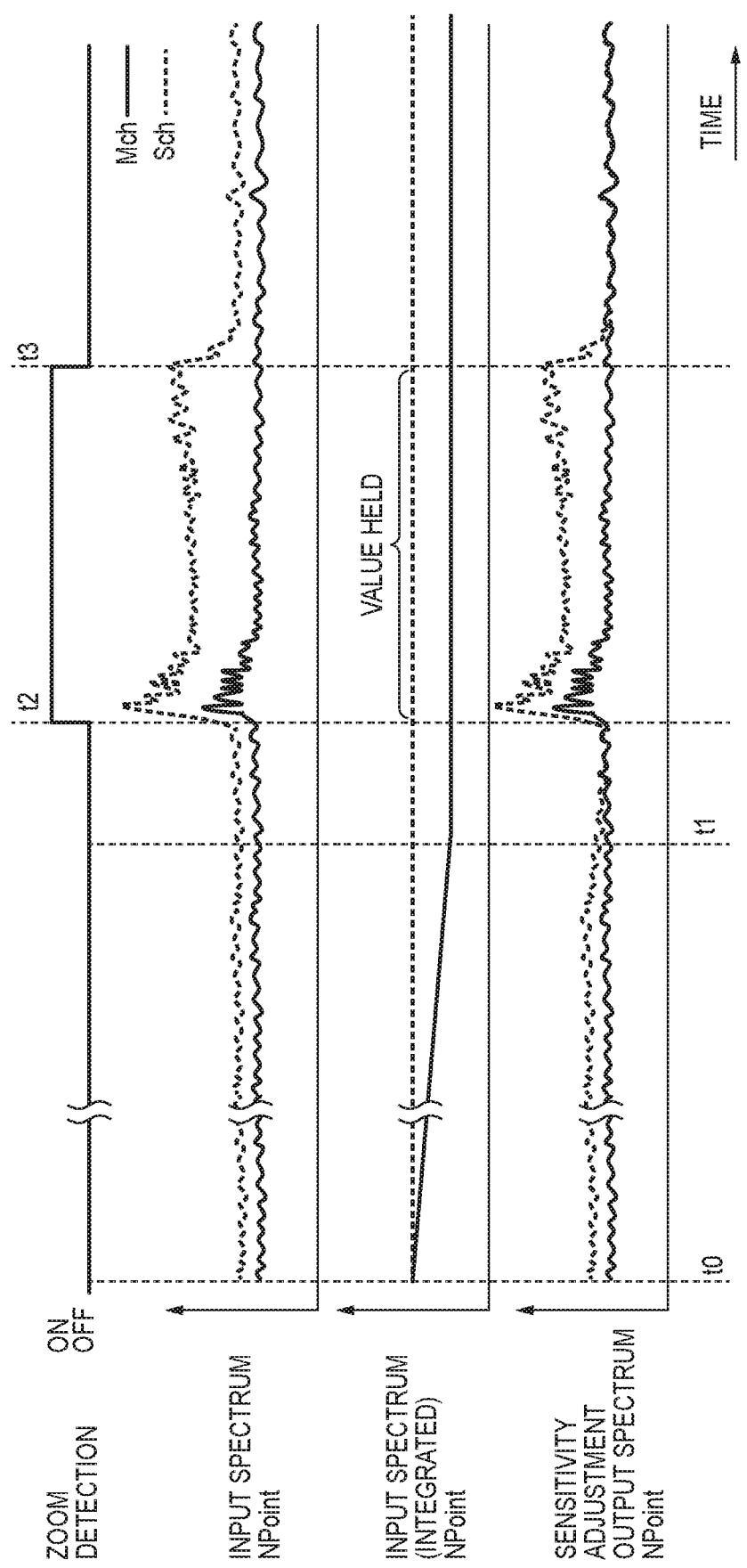

AUDIO PROCESSING APPARATUS AND CONTROL METHOD THEREOF

BACKGROUND OF THE INVENTION

Field of the Invention

The present invention relates to audio processing techniques in devices having drive mechanisms.

Description of the Related Art

Image capturing apparatuses such as digital cameras and digital video cameras record moving image data that is shot, along with audio data from the surroundings of a subject. Sound from the surroundings of a subject to be recorded will be called "surrounding environment sound" hereinafter.

An image capturing apparatus can also focus and zoom in on a moving subject while shooting by moving an optical lens. Optical lenses are moved mechanically, and moving the lens produces driving noise. If this driving noise overlaps with the surrounding environment sound, the quality of the audio in the moving image will be poor.

Japanese Patent Laid-Open No. 2006-279185 and Japanese Patent Laid-Open No. 2011-114465 are known documents disclosing techniques for reducing such noise.

Japanese Patent Laid-Open No. 2006-279185 discloses a spectral subtraction method. Put simply, the spectral subtraction method works as follows.

First, frequency spectrum data is generated by applying a Fast Fourier Transform to time-series audio data obtained from a microphone. Frequency spectrum data expressing driving unit noise, which is prepared in advance as a noise profile, is then subtracted from the original frequency spectrum data. The result of this subtraction is then subjected to an inverse Fast Fourier Transform (iFFT) to generate time-series audio data with the noise removed.

However, the driving signals output from driving units differ to varying degrees from product to product. Thus the noise defined by a single noise profile may not perfectly match the noise produced by the driving unit of an actual product, which means that sound aside from the noise may be removed from the surrounding environment sound.

In Japanese Patent Laid-Open No. 2011-114465, the image capturing apparatus is provided with not only a microphone for the normal surrounding environment sound, but also a microphone for noise detection. Thus according to Japanese Patent Laid-Open No. 2011-114465, the image capturing apparatus includes a first microphone for obtaining sound from outside the apparatus and a second microphone for obtaining noise produced inside the apparatus. The first microphone outputs an audio signal of the audio outside the apparatus, and the second microphone outputs a noise signal expressing driving noise produced within the apparatus. The image capturing apparatus reduces noise in the audio signal by a process for subtracting the noise signal from the audio signal.

However, with the method disclosed in Japanese Patent Laid-Open No. 2011-114465, a microphone for obtaining noise must be provided in addition to the microphone for obtaining the surrounding environment sound, which is problematic due to increased costs, required surface area, and so on. Although Japanese Patent Laid-Open No. 2011-114465 describes a configuration in which monaural audio is obtained, an apparatus that obtains stereo audio, for example, will require a total of three microphones, i.e., two for recording audio in stereo and one for noise.

SUMMARY OF THE INVENTION

According to an aspect of the invention, there is provided an audio processing apparatus comprising: a driving unit; a first microphone that primarily obtains sound from outside the audio processing apparatus; a second microphone that primarily obtains driving noise produced by the driving unit; a transform unit that transforms time series audio data obtained from the first microphone into first frequency spectrum data and transforms time series audio data obtained from the second microphone into second frequency spectrum data; a driving noise computation processing unit that computes a subtraction amount of the driving noise for each of frequencies from the first frequency spectrum data and the second frequency spectrum data obtained by the transform unit; a generating unit that, on the basis of the first frequency spectrum data and the second frequency spectrum data obtained by the transform unit and the driving noise subtraction amount obtained by the driving noise computation processing unit, generates left channel frequency spectrum data and right channel frequency spectrum data in which the driving noise is respectively suppressed; and an inverse transform unit that inverse-transforms the left channel frequency spectrum data and right channel frequency spectrum data generated by the generating unit into left channel time series audio data and right channel time series audio data, respectively.

Further features of the invention will become apparent from the following description of exemplary embodiments (with reference to the attached drawings).

BRIEF DESCRIPTION OF THE DRAWINGS

FIGS. 3A and 3B are diagrams illustrating the mechanical structure of the audio input unit of the image capturing apparatus according to the embodiment.

FIG. 7 is a diagram illustrating a system through which surrounding environment sound propagates to the image capturing apparatus.

FIGS. 8A to 8C are graphs illustrating a relationship between the phases of a frequency spectrum from a main microphone a and a frequency spectrum from a sub microphone b of the image capturing apparatus according to the embodiment.

FIG. 9 is a graph illustrating a relationship between a stereo sense enhancement coefficient and frequency according to the embodiment.

FIG. 11 is graphs illustrating an amplitude spectrum in time series frequencies at an Nth point in a frequency for the sub microphone b of the image capturing apparatus according to the embodiment.

FIGS. 13A and 13B are operation timing charts for a Mch–Sch computation unit of the image capturing apparatus according to the embodiment.

FIG. 14 is an operation timing chart for a sensitivity difference correction unit of the image capturing apparatus according to the embodiment.

DESCRIPTION OF THE EMBODIMENTS

Embodiments of the invention will be described in detail hereinafter with reference to the drawings. This embodiment describes an audio processing apparatus provided in an image capturing apparatus.

Figure 1:
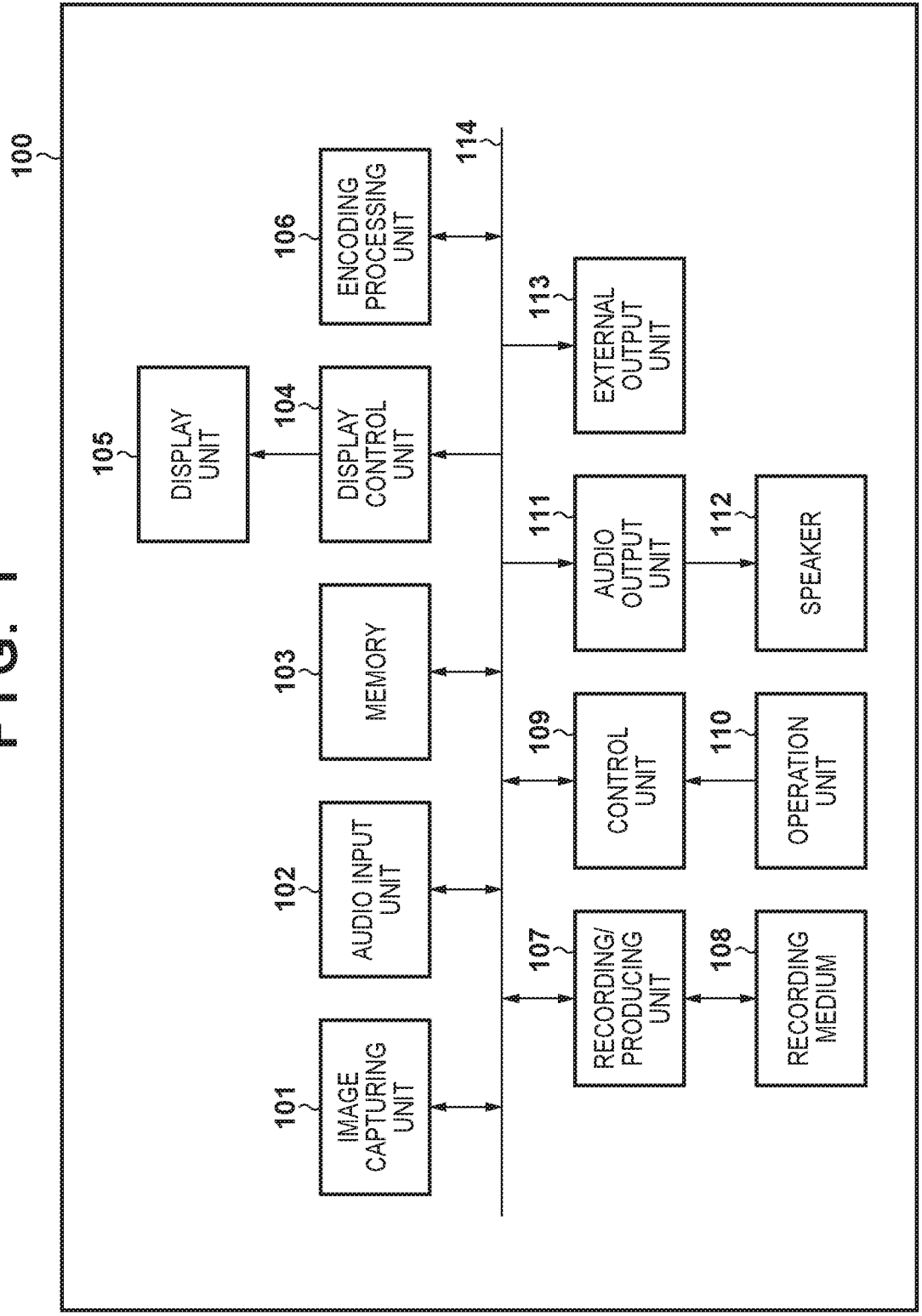
FIG. 1 is a block diagram illustrating an image capturing apparatus according to an embodiment.

FIG. 1 is a block diagram illustrating the configuration of an image capturing apparatus 100 according to the embodiment. The image capturing apparatus 100 includes an image capturing unit 101, an audio input unit 102, memory 103, a display control unit 104, and a display unit 105. The image capturing apparatus 100 also includes an encoding processing unit 106, a recording/reproducing unit 107, a recording medium 108, a control unit 109, an operation unit 110, an audio output unit 111, a speaker 112, an external output unit 113, and a bus 114 that connects these units.

The image capturing unit 101 converts an optical image of a subject, which has been obtained through a shooting optical lens, into an image signal using an image capturing device, and subjects the image signal to analog-digital conversion, image adjustment processing, and so on to generate image data. The shooting optical lens may be a built-in optical lens or an interchangeable optical lens. The image capturing device may be any photoelectric conversion device, such as a CCD or a CMOS device.

The audio input unit 102 collects peripheral sound from outside the audio processing apparatus (outside the image capturing apparatus, in this embodiment) using a built-in microphone or a microphone connected through an audio terminal, and generates an electrical signal. The audio input unit 102 also carries out analog-digital conversion, audio processing, and so on to generate audio data. The microphone may be directional or nondirectional, but this embodiment assumes that a nondirectional microphone is used.

The memory 103 is used to temporarily store image data obtained by the image capturing unit 101, audio data obtained by the audio input unit 102, and so on.

The display control unit 104 displays images expressed by the image data obtained by the image capturing unit 101, operation screens and menu screens of the image capturing apparatus 100, and so on in the display unit 105, an external display connected through a video terminal (not illustrated), or the like. The display unit 105 may be any type, e.g. a liquid-crystal display device.

The encoding processing unit 106 generates compressed image data. compressed audio data, and the like by reading out the image data and audio data temporarily stored in the memory 103 and subjecting that data to prescribed encoding. The audio data need not be compressed, however. The compressed image data may be compressed using any compression format, such as MPEG2 or H.264/MPEG4-AVC. The compressed audio data too may be compressed using any compression format, such as AC3(A)AC, ATRAC, or ADPCM. The encoding processing unit 106 also decodes the above-described encoded data (compressed image data and compressed audio data).

The recording/reproducing unit 107 records the compressed image data, compressed audio data or audio data, and various other data generated by the encoding processing unit 106 into the recording medium 108, and reads out the data from the recording medium 108. Here, the recording medium 108 is a non-volatile recording medium that records image data, audio data, and so on. The recording medium is, for example, a magnetic disk, an optical disk, semiconductor memory, or the like, and the type thereof is not restricted. The recording medium 108 may be fixed to the image capturing apparatus 100, or may be removable.

The control unit 109 controls the blocks of the image capturing apparatus 100 by sending control signals to those blocks of the image capturing apparatus 100 via the bus 114, and is constituted by a CPU for executing various types of control, memory, and so on. The memory used in the control unit 109 is ROM that stores various control programs, RAM used as a work area for computational processes, and so on, and also includes memory external to the control unit 109.

The operation unit 110 is constituted by buttons, dials, a touch panel, or a combination thereof, and sends instruction signals to the control unit 109 in response to user operations. Specifically, the operation unit 110 includes a shooting button for instructing the recording of moving images to start and stop, a zoom lever for instructing optical or digital zoom actions for the image, a directional key and an OK key for making various adjustments, and so on.

The audio output unit 111 outputs audio data and compressed audio data reproduced by the recording/reproducing unit 107, or audio data output by the control unit 109, to the speaker 112, the audio terminal, or the like. The external output unit 113 outputs compressed video data, compressed audio data, audio data, and the like reproduced by the recording/reproducing unit 107 to an external device. The bus 114 supplies various data such as audio data and image data, as well as various control signals, to the blocks of the image capturing apparatus 100.

The foregoing has described the configuration of the image capturing apparatus 100 according to the embodiment. Next, normal operations of the image capturing apparatus according to the embodiment will be described.

With the image capturing apparatus 100 according to this embodiment, power from a power supply unit (not illustrated) is supplied to the blocks of the image capturing apparatus in response to a user operating the operation unit 110 to give an instruction to turn the power on.

When power is supplied, the control unit 109 uses an instruction signal from the operation unit 110 to confirm which mode, e.g., shooting mode or playback mode, is currently set by a mode change switch in the operation unit 110. When in moving image recording mode, which is a shooting mode, image data obtained by the image capturing unit 101 and audio data obtained by the audio input unit 102 are saved as a single image file. When in playback mode, an image file recorded in the recording medium 108 is reproduced by the recording/reproducing unit 107 and displayed as a moving image in the display unit 105, and the audio is output from the speaker 112.

In shooting mode, first, the control unit 109 sends control signals to the blocks of the image capturing apparatus 100 to transition to a shooting standby state, after which the following operations are carried out.

The image capturing unit 101 converts an optical image of a subject, which has been obtained through the shooting optical lens, into a moving image signal using an image capturing device, and subjects the moving image signal to analog-digital conversion, image adjustment processing, and so on to generate moving image data. The image capturing unit 101 then sends the obtained moving image data to the display control unit 104 to display the data in the display unit 105. Note that the image capturing unit 101 outputs a moving image signal at a framerate of 30 frames/second, with each frame being 1920 horizontal pixels by 1080 vertical pixels. The user prepares to shoot while viewing a screen displayed in this manner.

The audio input unit 102 converts analog audio signals obtained from a plurality of microphones into digital signals, and generates multichannel audio data by processing the obtained plurality of digital audio signals. The audio input unit 102 sends the obtained audio data to the audio output unit 111 to output the data as sound from the connected speaker 112, earphones (not illustrated), or the like. The user can also make manual volume adjustments to determine a recording volume while listening to the sound output in this manner.

Next, when the user operates a record button of the operation unit 110 and a shooting start instruction signal is sent to the control unit 109, the control unit 109 sends shooting start instruction signals to the blocks in the image capturing apparatus 100, and the shooting mode transitions to a moving image recording mode in the shooting mode. Specifically, the processing carried out by the control unit 109 is as follows.

The image capturing unit 101 converts an optical image of a subject, which has been obtained through the shooting optical lens, into a moving image signal using an image capturing device, and subjects the moving image signal to analog-digital conversion, image adjustment processing, and so on to generate moving image data. The image capturing unit 101 then sends the obtained moving image data to the display control unit 104 to display the data in the display unit 105. The image capturing unit 101 also sends the obtained image data to the memory 103.

The audio input unit 102 converts the analog audio signals obtained from the plurality of microphones into digital signals, and generates multichannel audio data by processing the obtained plurality of digital audio signals. The audio input unit 102 then sends the obtained audio data to the memory 103. If there is only one microphone, the audio input unit 102 converts the analog audio signal obtained from the microphone into a digital signal to generate the audio data, and then sends the audio data to the memory 103.

The encoding processing unit 106 generates compressed moving image data, compressed audio data, and the like by reading out the moving image data and audio data temporarily stored in the memory 103 and subjecting that data to predetermined encoding, and then stores the compressed data in the memory 103.

The control unit 109 forms a data stream by synthesizing the compressed moving image data and compressed audio data stored in the memory 103, and outputs the data stream to the recording/reproducing unit 107. If the audio data is not compressed, the control unit 109 forms the data stream by synthesizing the audio data and the compressed moving image data stored in the memory 103, and outputs the data stream to the recording/reproducing unit 107.

The recording/reproducing unit 107 writes the data stream into the recording medium 108 as a single moving image file, according to file system management such as UDF or FAT.

The image capturing apparatus 100 continues the above-described processing while a moving image is being recorded. When the user then operates the record button of the operation unit 110 and a shooting end instruction signal is sent to the control unit 109, the control unit 109 sends shooting end instruction signals to the blocks in the image capturing apparatus 100 to cause the following operations to be carried out.

The image capturing unit 101 and the audio input unit 102 stop generating the moving image data and the audio data, respectively. Once the encoding processing unit 106 has finished generating the compressed moving image data and compressed audio data and the like by reading out the remaining image data and audio data stored in the memory and subjecting the data to predetermined encoding, the operations are stopped. If the audio data is not compressed, the operations are of course stopped once the compressed moving image data has been generated.

The control unit 109 then forms a data stream by synthesizing the final compressed moving image data and compressed audio data or audio data, and outputs the data stream to the recording/reproducing unit 107.

The recording/reproducing unit 107 writes the data stream into the recording medium 108 as a single moving image file, according to file system management such as UDF or FAT. Once the supply of the data stream has ended, the moving image file is completed and the recording operations stopped.

Upon the recording operations stopping, the control unit 109 sends control signals to the blocks of the image capturing apparatus 100 to transition back to the shooting standby state.

Playback mode will be described next. When the user operates the operation unit 110 and switches to playback mode, the control unit 109 sends control signals to the blocks of the image capturing apparatus 100 to a playback state, after which the following operations are carried out.

The recording/reproducing unit 107 reads out the moving image file constituted by the compressed moving image data and compressed audio data recorded in the recording medium 108, and sends the read-out compressed moving image data and compressed audio data to the encoding processing unit 106.

The encoding processing unit 106 decodes the compressed moving image data and compressed audio data, and sends the decoded data to the display control unit 104 and the audio output unit 111, respectively. The display control unit 104 displays the decoded moving image data in the display unit 105. The audio output unit 111 outputs the decoded audio data to the built-in speaker 112 or a connected external speaker to play back the data as sound.

The image capturing apparatus 100 according to this embodiment can record and play back moving images and audio as described above.

In this embodiment, the audio input unit 102 subjects the audio signals obtained by the microphones to processing such as level adjustment processing when obtaining those audio signals. This processing may be carried out continuously while the apparatus is operating, or may be carried out after shooting mode is selected. Alternatively, the processing may be carried out after a mode pertaining to audio recording has been selected. The processing may be carried out in response to the recording of audio starting in the mode pertaining to audio recording. This embodiment assumes that the processing is carried out upon the shooting of a moving image starting.

Figure 2:
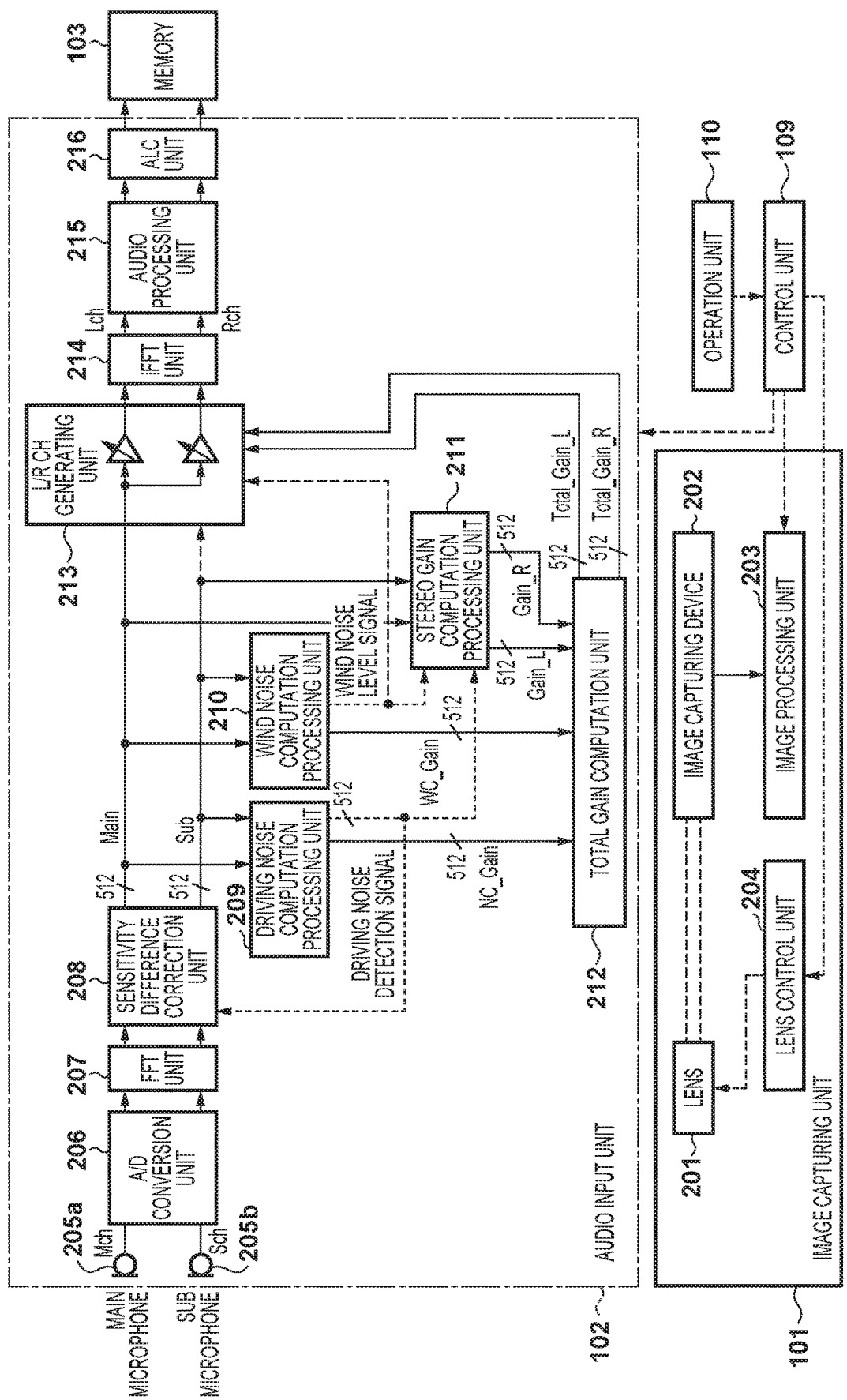
FIG. 2 is a block diagram illustrating an image capturing unit and an audio input unit of the image capturing apparatus according to the embodiment in detail.

FIG. 2 is a block diagram illustrating the image capturing unit 101 and the audio input unit 102 of the image capturing apparatus 100 according to this embodiment.

The image capturing unit 101 includes an optical lens 201 that obtains an optical image of a subject, and an image capturing device 202 that converts the optical image of the subject obtained by the optical lens 201 into an electrical signal (an image signal). Furthermore, the image capturing unit 101 includes an image processing unit 203 that converts an analog image signal obtained by the image capturing device 202 into a digital image signal, subjects that signal to image quality adjustment processing to form image data, and sends the image data to memory. The image capturing unit 101 further includes an optical lens control unit 204 including a known driving mechanism for moving the optical lens 201, such as a position sensor and a motor. Although this embodiment describes the optical lens 201 and the optical lens control unit 204 as being built into the image capturing unit 101, the optical lens 201 may be an interchangeable lens that can be attached to the image capturing apparatus 100 using a lens mount and removed. The optical lens control unit 204 may be provided within the interchangeable lens.

When an instruction for zoom operations, focus adjustment, or the like is input by the user operating the operation unit 110, the control unit 109 sends a control signal (driving signal) to the optical lens control unit 204 to move the optical lens 201. In response to the control signal, the optical lens control unit 204 checks the position of the optical lens 201 using the position sensor (not illustrated) and moves the optical lens 201 using the motor or the like (not illustrated). If the image obtained by the image processing unit 203, the distance to the subject, and the like are confirmed by the control unit 109 and adjustments are made automatically, the optical lens control unit 204 sends a control signal for driving the optical lens. If a so-called stabilizing function for preventing blur in the image is provided, the control unit 109 sends a control signal for moving the optical lens 201 to the optical lens control unit 204 on the basis of vibrations detected by a vibration sensor (not illustrated).

At this time, driving noise is produced by the optical lens 201 moving, and driving noise is also produced by the motor moving the optical lens 201. The optical lens control unit 204 drives the optical lens 201 in accordance with the control signal from the control unit 109 for driving the optical lens 201. Accordingly, the control unit 109 can know (detect or determine) the timing at which the driving noise arises.

In this embodiment, the optical lens 201 can be controlled to optically zoom at a maximum of 50× and a minimum of 1×, for example. This is called "optical zoom" in this embodiment. Of course, the optical zoom rate may be greater than or less than the above values. "Optical zoom" refers to zooming the optical image of a subject by the optical lens control unit 204 moving the optical lens 201 in response to an instruction from the control unit 109. The image processing unit 203 includes a digital zoom function for outputting an image signal corresponding to a zoomed-in part of the image signal obtained by the image capturing device 202. A digital zoom function in which the range of the image obtained by the image capturing device 202 is broadened and the image processing unit 203 outputs a zoomed-out image signal with a larger image size is also included.

The foregoing has described the configuration and operations of the image capturing unit 101 according to the embodiment. The configuration and operations of the audio input unit 102 will be described next.

The image capturing apparatus 100 according to this embodiment includes two microphones, indicated by reference signs 205$a$ and 205$b$. The microphones 205$a$ and 205$b$ convert vibrations propagating through the air (a medium) into electrical signals and output audio signals. The microphone 205$a$ is a main (MAIN) microphone and the microphone 205$b$ is a sub (SUB) microphone, and will be identified by those names hereinafter.

Although details will be given later, the main microphone 205$a$ functions as a microphone handling one channel of stereo audio, and is primarily a microphone for obtaining sound from outside the audio processing apparatus (outside the image capturing apparatus 100, in this embodiment). The sub microphone 205$b$ is arranged in a position where the sub microphone 205$b$ can function as a microphone handling the other channel of stereo audio. Compared to the main microphone 205$a$, the sub microphone 205$b$ is primarily a microphone for obtaining driving noise from driving units within the audio processing apparatus (the image capturing apparatus 100).

The main microphone 205$a$ outputs an analog audio signal as Mch (main channel), and the sub microphone 205$b$ outputs an analog audio signal as Sch (sub channel). In this embodiment, a first audio input unit corresponds to the main microphone 205$a$, and a first audio signal corresponds to Mch. A second audio input unit corresponds to the sub microphone 205$b$, and a second audio signal corresponds to Sch. Because a two-channel stereo format is used in this embodiment, the main microphone 205$a$ and the sub microphone 205$b$ are provided in locations separated by a predetermined distance in the horizontal direction when the image capturing unit 101 is placed upright. Although two microphones are used in this embodiment, the configuration may include a greater number of microphones.

The analog audio signals obtained by the main microphone 205$a$ and the sub microphone 205$b$ are supplied to an A/D conversion unit 206, which converts each audio signal into digital audio data. This embodiment assumes that the A/D conversion unit 206 samples at a sampling rate of 48 KHz and generates digital data with 16 bits per sample.

The digital audio data obtained by the A/D conversion unit 206, which is in time series of pre-set audio signal periods (frames), is supplied to a FFT unit 207, which subjects the data to a Fast Fourier Transform to transform the data into frequency spectrum data for individual frequencies. In this embodiment, the data is transformed into frequency spectrum data for 1024 points in a frequency spectrum from 0 Hz to 48 kHz, with 512 points of frequency spectra present up to the Nyquist frequency of 24 kHz. The frequency spectrum data from the main microphone 205a is indicated by Main[0]-[511], and the frequency spectrum data from the sub microphone 205b is indicated by Sub[0]-[511]. Additionally, in this embodiment, first audio spectrum data is indicated by Main[0]-[511], and second audio spectrum data is indicated by Sub[0]-[511]. The numbers appended to each instance of spectrum data indicate a minimum frequency by "0", and a maximum frequency by "511".

A driving noise computation processing unit 209 determines a driving noise subtraction amount for each of frequency components in the frequency spectrum data obtained by the FFT unit 207, in accordance with control signals from the control unit 109 for driving the driving unit. This driving noise is produced when the optical lens 201 is driven. Note that in this embodiment, "driving unit" is assumed to refer to the optical lens 201 driven for zoom operations and focus adjustment. The driving noise computation processing unit 209 outputs NC_Gain[0]-[511] expressing the subtraction amount for each frequency spectrum, and a driving noise detection signal.

Although details will be given later, a sensitivity difference correction unit 208 corrects the sensitivity of Sub[0]-[511] relative to Main[0]-[511] in the current frame in accordance with the driving noise detection signal of the previous frame from the driving noise computation processing unit 209, and outputs corrected frequency spectrum data Main[0]-[511] and Sub[0]-[511].

A wind noise computation processing unit 210 detects wind noise from the frequency spectrum data obtained from the FFT unit 207, and determines a subtraction amount. The wind noise computation processing unit 210 then outputs frequency spectrum data WC_Gain[0]-[511] of the determined wind noise, and a wind noise level signal.

A stereo gain computation processing unit 211 determines a gain of a stereo Lch (left channel) and a stereo Rch (right channel) for the frequency spectrum data from the FFT unit 207. The stereo gain computation processing unit 211 then outputs Gain_L[0]-[511] and Gain_R[0]-[511] expressing the gain of each channel for each determined frequency spectrum component. The left channel gain is Gain_L[0]-[511], and the right channel gain is Gain_R[0]-[511].

A total gain computation unit 212 totals the NC_Gain[0]-[511], the WC_Gain[0]-[511], the Gain_L[0]-[511], and the Gain_R[0]-[511] determined by the driving noise computation processing unit 209, the wind noise computation processing unit 210, and the stereo gain computation processing unit 211, and outputs Total_Gain_L[0]-[511] and Total_Gain_R[0]-[511]. Specifically, the following formulas are used. In this embodiment, the total gain computation unit 212 functions as a total gain determination unit.

$$\text{Total\_Gain\_}R[\ ]=NC\_\text{Gain}[\ ]+WC\_\text{Gain}[\ ]+\text{Gain\_}R[\ ]$$

$$\text{Total\_Gain\_}L[\ ]=NC\_\text{Gain}[\ ]+WC\_\text{Gain}[\ ]+\text{Gain\_}L[\ ]$$

A L/R ch generation unit 213 generates Lch and Rch frequency spectrum data using the frequency spectrum of each frequency of the Main[0]-[511], and the Total_Gain_L[0]-[511] and Total_Gain_R[0]-[511] determined by the total gain computation unit 212 (this will be described in detail later). In other words, the L/R ch generation unit 213 functions as a stereo generation unit in this embodiment.

An iFFT unit 214 subjects the frequency spectrum data of each channel, generated by the L/R ch generation unit 213, to an inverse Fast Fourier Transform, to return the data to an audio signal in time series of each channel.

An audio processing unit 215 carries out processing such as equalizing. An auto level controller ("ALC unit 216" hereinafter) adjusts the amplitude of each audio signal in time series to a predetermined level.

Through the above-described configuration, the audio input unit 102 subjects an audio signal to predetermined processing to form audio data, and sends that data to the memory 103.

Figure 4:
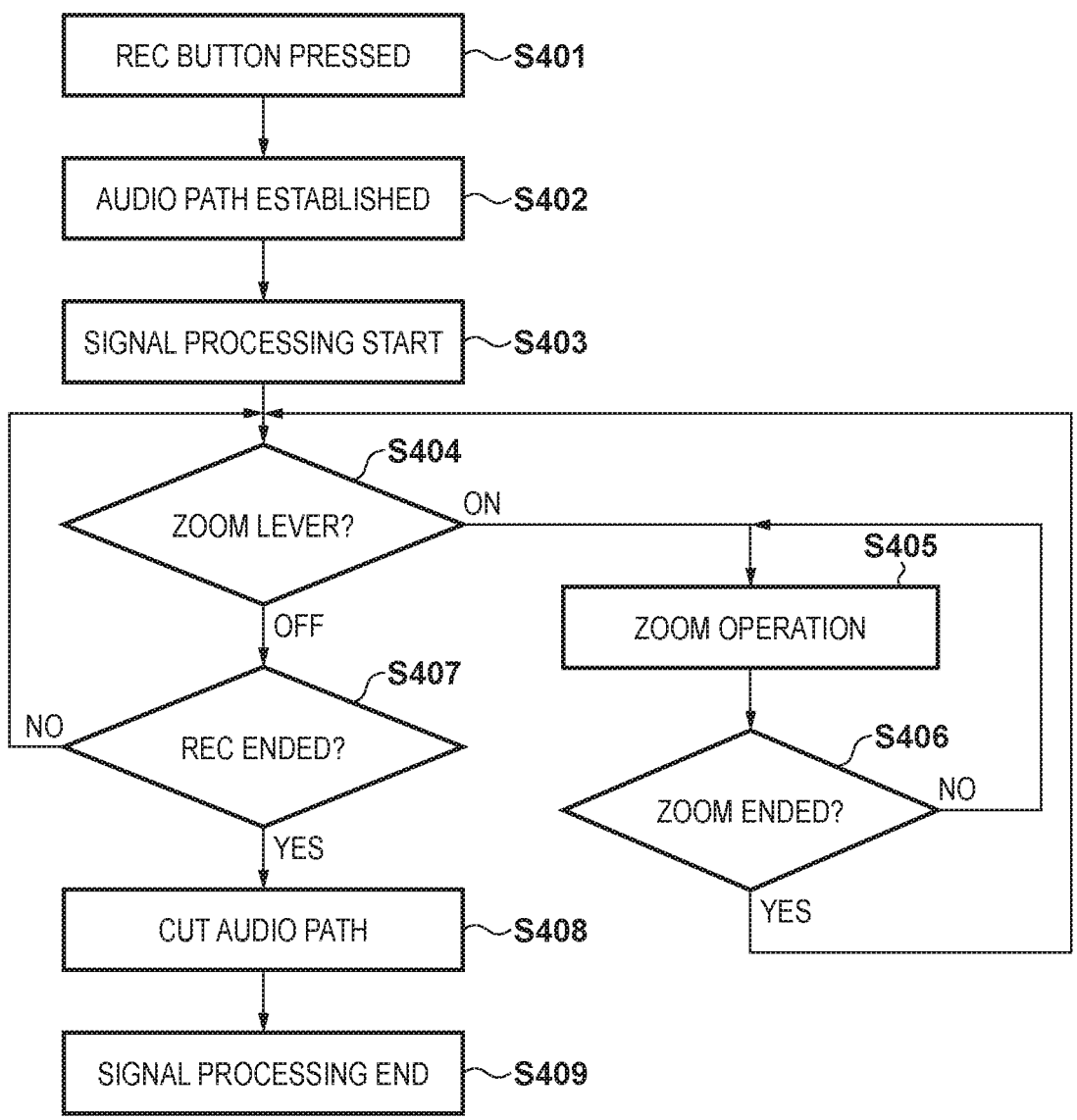
FIG. 4 is a flowchart illustrating a REC sequence of the image capturing apparatus according to the embodiment.

Next, recording operations performed by the image capturing apparatus 100 according to this embodiment will be described with reference to FIG. 4. FIG. 4 is a flowchart illustrating a recording sequence of the image capturing apparatus 100 according to the embodiment.

This process is started in S401 by the user operating the operation unit 110 to instruct recording (REC) to start. In S402, the control unit 109 establishes an audio path for audio recording. After the audio path is established, in S403, the control unit 109 makes initial settings for signal processing, including the control described in this embodiment, and starts the processing. Details of this signal processing will be given later. The signal processing, including the control described in this embodiment, is carried out until the REC sequence ends.

The control unit 109 monitors user operation of the operation unit 110 during the recording processing sequence. If the user has operated the zoom lever, which is part of the operation unit 110, the process moves from S404 to S405, and the control unit 109 controls the image capturing unit 101 to carry out zoom processing. This zoom processing continues until it is determined in S406 that the user has stopped operating the zoom lever. Note that as described earlier, driving noise is produced by the movement of the optical lens 201 during the zoom processing, and that noise is recorded along with the surrounding environment sound.

When the control unit 109 determines that recording has been instructed to stop in response to the user operating the operation unit 110 or in accordance with the state of the recording medium 108, the process moves from S407 to S408. The control unit 109 cuts the audio path in S408 and ends the signal processing in S409.

Figure 6:
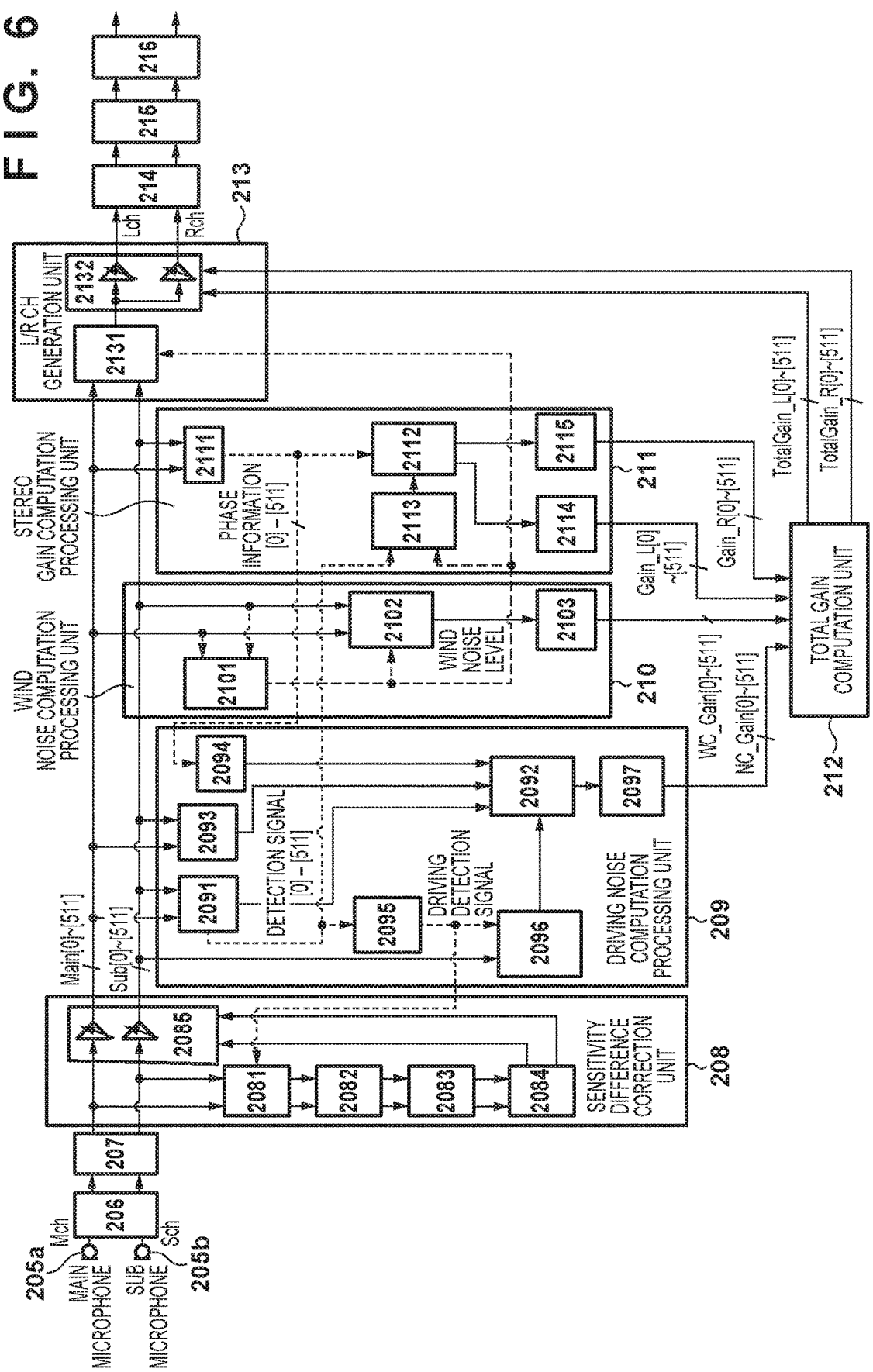
FIG. 6 is a block diagram illustrating the configuration of the audio input unit of the image capturing apparatus according to the embodiment in detail.

Next, the audio input unit 102 of the image capturing apparatus 100 according to this embodiment will be described in detail with reference to FIG. 6. FIG. 6 is a block diagram illustrating the configuration of the audio input unit 102 according to this embodiment in detail.

As described earlier, the audio input unit 102 according to this embodiment includes the main microphone 205a and the sub microphone 205b, which convert sound vibrations propagating through the air into electrical signals and output audio signals. Also as described earlier, the A/D conversion unit 206 samples the analog audio signals at 48 KHz and 16 bits to convert the analog audio signals into digital audio data.

The sensitivity difference correction unit 208 corrects a sensitivity difference between the frequency spectrum data Main[0]-[511] from the main microphone 205a and the frequency spectrum data Sub[0]-[511] from the sub microphone 205b. To that end, the sensitivity difference correction unit 208 includes a sensitivity correction integrator 2081, a sensitivity correction detection unit 2082, a correction amount computation unit 2083, a sensitivity correction gain table 2084, and a sensitivity difference correction gain unit 2085.

The sensitivity correction integrator 2081 applies a time constant to level changes in the time axis direction for the frequency spectrum data Main[0]-[511] from the main microphone 205a and the frequency spectrum data Sub[0]-[511] from the sub microphone 205b.

The sensitivity correction detection unit 2082 finds, for each frequency point, a level difference Main[n]-Sub[n] between the frequency spectrum data Main[0]-[511] and Sub[0]-[511] to which the time constant has been applied by the sensitivity correction integrator 2081. Note that the difference can be positive or negative as well.

The correction amount computation unit 2083 calculates a correction amount for Sub[n] to make Main[n] equal to Sub[n], if the difference level from the sensitivity correction detection unit 2082 is negative (equivalent to a situation where Main[n] is less than Sub[n]).

Sub[n] need not be corrected if the difference level from the sensitivity correction detection unit 2082 is positive (equivalent to a situation where Main[n] is greater than or equal to Sub[n]). Thus in this case, the correction amount computation unit 2083 outputs 0 as the correction amount for Sub[n].

The sensitivity correction gain table 2084 holds a specific correction amount for each frequency spectrum Sub[0]-[511] calculated by the correction amount computation unit 2083.

The sensitivity difference correction gain unit 2085 actually corrects the level of each frequency spectrum Sub[0]-[511] on the basis of the sensitivity correction gain table 2084.

Here, the above-described time constant is a unit of several tens of seconds to delay tracking of the sensitivity correction as much as possible. Additionally, the sensitivity correction integrator 2081 stops these operations if the driving noise detection signal, which indicates that driving noise has been detected, has been received by a driving detection unit 2095 (described later). This is done to avoid integration in unstable periods where the optical lens 201 is driving.

The foregoing has described the processing units constituting the sensitivity difference correction unit 208 according to the embodiment. The driving noise computation processing unit 209 will be described next.

The driving noise computation processing unit 209 determines the driving noise subtraction amount NC_Gain[0]-[511] on the basis of the frequency spectrum data Main[0]-[511] and Sub[0]-[511] from the main microphone 205a and sub microphone 205b, respectively, and outputs the driving noise detection signal, which indicates that driving noise has been detected. To that end, the driving noise computation processing unit 209 includes a Mch-Sch computation unit 2091, a driving noise removal gain computation unit 2092, a time-based amplitude variation detection unit 2093, a time-based phase variation detection unit 2094, the driving detection unit 2095, an inter-frame amplitude difference detection unit 2096, and a driving noise subtraction amount integrator 2097.

The Mch-Sch computation unit 2091 outputs, as the driving noise subtraction amount, a value obtained by subtracting the frequency spectrum data Sub[0]-[511] obtained from the sub microphone 205b from the frequency spectrum data Main[0]-[511] obtained from the main microphone 205a.

However, if Main[n] is greater than Sub[n] at the nth point of the frequency spectrum, the subtraction amount [n] is 0. In other words, the Mch-Sch computation unit 2091 outputs a negative value as the subtraction amount [n] under the condition that Main[n]-Sub[n] is less than 0 at the nth point of the frequency spectrum.

If Sub[n] is sufficiently high with respect to Main[n] and Main[n]-Sub[n] is thus less than a pre-set threshold (a negative value), the Mch-Sch computation unit 2091 outputs a detection signal [n] indicating that driving noise has been detected, but otherwise does not output the detection signal. In actuality, noise being detected may be represented by "1", and noise not being detected, by "0".

The determination of whether or not driving noise has been detected may be carried out by reversing the subtraction relationship and comparing Sub[n]-Main[n] to a threshold (having a positive value). In this case, the Mch-Sch computation unit 2091 outputs a signal indicating that driving noise has been detected when the result of the computation is greater than the threshold.

The driving detection unit 2095 receives one frame's worth of the detection signal [0]-[511] from the Mch-Sch computation unit 2091, and if one or more detection signals are present, outputs the driving noise detection signal indicating that driving noise has been detected in that frame.

When a positive threshold is defined as Th, the processing by the Mch-Sch computation unit 2091 and the driving detection unit 2095 can be referred to as determining whether or not an "i" (where i is from 0 to 511) satisfying the following formula is present, and outputting the result of that determination as a signal indicating that driving noise has been detected.

$$\text{Main}[i]+Th<\text{Sub}[i]$$

The time-based amplitude variation detection unit 2093 detects an amplitude variation amount between frames in the time direction, for the frequency spectrum data Main[0]-[511] from the main microphone 205a and the frequency spectrum data Sub[0]-[511] from the sub microphone 205b. Specifically, the time-based amplitude variation detection unit 2093 finds and outputs the value of a difference between a component value at the nth point in the frequency spectrum of the current frame and a component value at the nth point in the frequency spectrum of the previous frame. The time-based amplitude variation detection unit 2093 outputs a time-based amplitude variation amount [n] if the variation amount at the nth point exceeds a pre-set threshold, and outputs 0 if the variation amount is less than or equal to the threshold.

The time-based phase variation detection unit 2094 detects a phase variation amount between the frequency spectrum data Main[0]-[511] from the main microphone 205a and the frequency spectrum data Sub[0]-[511] from the sub microphone 205b on the basis of phase information obtained from a phase difference determination unit 2111, which will be described later. For example, if the variation amount at the nth point of the frequency spectrum exceeds a predetermined threshold, the time-based phase variation detection unit 2094 outputs a time-based phase variation amount [n]. If the variation amount is less than or equal to the threshold, the time-based phase variation detection unit 2094 does not output the time-based phase variation amount [n], or outputs 0 as the time-based phase variation amount [n].

The inter-frame amplitude difference detection unit 2096 detects an amplitude difference between frames in the time direction for the frequency spectrum data Sub[0]-[511] from the sub microphone 205b, on the basis of the driving noise detection signal from the driving detection unit 2095. For example, if, at the nth point of the frequency spectrum, a driving noise detection signal is present and the amplitude difference between the previous frame and the current frame exceeds the predetermined threshold, the inter-frame amplitude difference detection unit 2096 outputs an inter-frame amplitude difference amount [n]. If the difference is less than or equal to the threshold, the inter-frame amplitude difference detection unit 2096 does not output the inter-frame amplitude difference amount [n], or outputs 0 as the inter-frame amplitude difference amount [n].

The driving noise removal gain computation unit 2092 multiplies the result of each of the above-described subtraction amount [0]-[511] from the Mch–Sch computation unit 2095, time-based amplitude variation amount [0]-[511] from the time-based amplitude variation detection unit 2093, time-based phase variation amount [0]-[511] from the time-based phase variation detection unit 2094, and inter-frame amplitude difference amount [0]-[511] from the inter-frame amplitude difference detection unit 2096 by a predetermined coefficient, for the same frame, to calculate and output an added driving noise removal amount [0]-[511].

The driving noise subtraction amount integrator 2097 applies a time constant to a variation amount in the time direction for the driving noise removal amount [0]-[511] output from the driving noise removal gain computation unit 2092, and outputs the driving noise removal gain NC_Gain [0]-[511] (with a positive or negative sign).

The foregoing has described the configuration and operations of the driving noise computation processing unit 209 according to this embodiment. The wind noise computation processing unit 210 will be described next.

The wind noise computation processing unit 210 detects wind noise from the frequency spectrum data Main[0]-[511] obtained from the main microphone 205a and the frequency spectrum data Sub[0]-[511] obtained from the sub microphone 205b, and outputs the WC_Gain[0]-[511], which expresses a subtraction amount, and the wind noise level signal. The wind noise computation processing unit 210 includes a wind detection unit 2101, a wind noise gain computation unit 2102, and a wind noise subtraction amount integrator 2103.

The wind detection unit 2101 detects the wind noise level on the basis of a correlation between a predetermined number of points in the low-frequency ranges of the frequency spectrum data Main[0]-[511] from the main microphone 205a and the frequency spectrum data Sub[0]-[511] from the sub microphone 205b. For example, the wind noise level is found and output according to the following formula, at 10 points in the low range. Here, "n" is from 0 to 9 in this embodiment, but the number may be changed as appropriate.

wind noise level=Σ(Main[$n$]−Sub[$n$])/(Main[$n$]+Sub[$n$])

Σ in the above formula indicates the sum of n=0 to 9.

Figure 17:
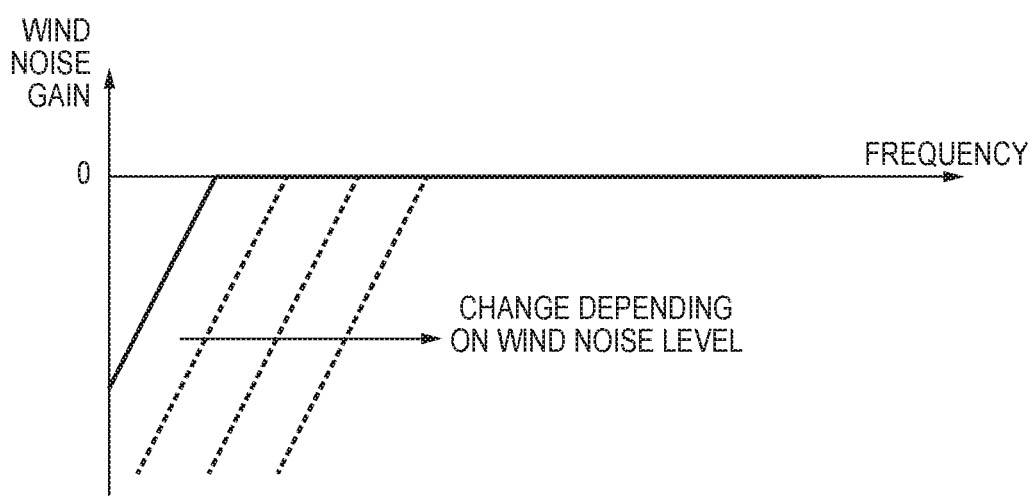
FIG. 17 is a graph illustrating a frequency relationship between a wind noise level and a wind noise gain according to the embodiment.

The wind noise gain computation unit 2102 includes a table holding characteristic line segments, as indicated in FIG. 17. As illustrated in FIG. 17, for a single line segment, the gain is negative below a certain frequency and is 0 at or above that frequency. A plurality of line segments, each having a different position for the frequency where the gain changes from negative to 0, are present. The wind noise gain computation unit 2102 determines and outputs a wind noise gain [0]-[511] using a single line segment based on the wind noise level. Although this embodiment describes determining the wind noise gain [0]-[511] using a table, the wind noise gain [0]-[511] may be determined using a function that takes the wind noise level as an argument.

The wind noise subtraction amount integrator 2103 applies a time constant to a variation amount in the time direction for the wind noise gain [0]-[511] output from the wind noise gain computation unit 2102, and outputs the wind noise gain WC_Gain[0]-[511] (with a positive or negative sign).

The foregoing has described the configuration and operations of the wind noise computation processing unit 210 according to this embodiment. The stereo gain computation processing unit 211 according to the embodiment will be described next.

The stereo gain computation processing unit 211 generates and outputs the stereo Lch gain Gain_L[0]-[511] and Rch gain Gain_R[0]-[511] from the frequency spectrum data Main[0]-[511] obtained from the main microphone 205a and the frequency spectrum data Sub[0]-[511] obtained from the sub microphone 205b. To that end, the stereo gain computation processing unit 211 includes the phase difference determination unit 2111, a stereo gain computation unit 2112, a stereo suppression unit 2113, a left gain integrator 2114, and a right gain integrator 2115.

The phase difference determination unit 2111 calculates the phase information of the frequency spectrum data Sub [0]-[511] with respect to the frequency spectrum data Main [0]-[511].

For example, phase information [n] for frequency point n is calculated according to the following formula, assuming a phase vector at each point in the frequency spectrum data is represented by V( ).

phase information[$n$]=|$V$(Main[$n$])×$V$(Sub[$n$])|/(|$V$(Main[$n$])|·|$V$(Sub[$n$])|)

Here, the "|x|" on the right side represents the absolute value (scalar) of a vector x; the "·" in the denominator, the product of scalars; and the "×" in the numerator, an outer product corresponding to the sine of the two vectors.

The phase difference determination unit 2111 outputs the phase information [0]-[511] calculated in accordance with the above formula.

The stereo gain computation unit 2112 computes stereo gain [0]-[511] from the phase information [0]-[511] obtained from the phase difference determination unit 2111. For example, the gain in each channel is obtained through the following formulas at frequency point n.

stereo gain for Lch generation=1+phase information [$n$]×enhancement coefficient stereo gain for Rch generation=1−phase information [$n$]×enhancement coefficient The stereo gain computation unit 2112 outputs the Lch and Rch stereo gain [n] calculated through the above formula. Here, the enhancement coefficient changes depending on the frequency, and is assumed to have an upper limit of 1 and a lower limit of 0.

The stereo suppression unit 2113 sets the enhancement coefficient to 0 when the detection signal indicating that driving noise has been detected has been received from the Mch–Sch computation unit 2091 in the driving noise computation processing unit 209. The stereo suppression unit 2113 also sets the enhancement coefficient to 0 in accordance with the wind noise level from the wind detection unit 2101 in the wind noise computation processing unit 210.

The left gain integrator 2114 applies a predetermined time constant to the variation amount in the time direction for the Lch generation stereo gain [0]-[511] output from the stereo gain computation unit 2112, and outputs the result as a stereo gain GainL[0]-[511] (with a positive or negative sign).

The right gain integrator 2115 applies a predetermined time constant to the variation amount in the time direction for the Rch generation stereo gain [0]-[511] output from the stereo gain computation unit 2112, and outputs the result as a stereo gain GainR[0]-[511] (with a positive or negative sign).

The foregoing has described the configuration and operations of the stereo gain computation processing unit 211 according to this embodiment. The total gain computation unit 212 according to the embodiment will be described next.

The total gain computation unit 212 totals the NC_Gain[0]-[511], the WC_Gain[0]-[511], the Gain_L[0]-[511], and the Gain_R[0]-[511] determined by the driving noise computation processing unit 209, the wind noise computation processing unit 210, and the stereo gain computation processing unit 211, and outputs the Total_Gain_L[0]-[511], and Total_Gain_R[0]-[511]. The specific formulas are as follows.

$$\text{Total\_Gain\_}L[\ ] = NC\_\text{Gain}[\ ] + WC\_\text{Gain}[\ ] + \text{Gain\_}L[\ ]$$

$$\text{Total\_Gain\_}R[\ ] = NC\_\text{Gain}[\ ] + WC\_\text{Gain}[\ ] + \text{Gain\_}R[\ ]$$

The L/R ch generation unit 213 will be described next. The L/R ch generation unit 213 generates Lch and Rch output frequency spectrum data from the frequency spectrum data Main[0]-[511], using the Total_Gain_L[0]-[511] and Total_Gain_R[0]-[511] determined by the total gain computation unit 212. The L/R ch generation unit 213 includes a Mch/Sch selection unit 2131 and a L/R ch gain addition unit 2132.

The Mch/Sch selection unit 2131 selects a range of Sub[0]-[511] frequency points to be synthesized with the frequency spectrum data Main[0]-[511], in accordance with the wind noise level from the wind detection unit 2101. The Mch/Sch selection unit 2131 also changes a boundary position for the synthesis from a low-frequency point to a high-frequency point in accordance with the wind noise level. If no wind is detected, the Mch/Sch selection unit 2131 outputs the frequency spectrum data Main[0]-[511] as-is without any synthesis.

The L/R ch gain addition unit 2132 uses the Total_Gain_L[0]-[511] and Total_Gain_R[0]-[511] determined by the total gain computation unit 212 to generate left and right channel (Lch and Rch) frequency spectrum data for the frequency spectrum data Main[0]-[511] output from the Mch/Sch selection unit 2131.

The foregoing has described the configuration and operations of the L/R ch generation unit 213 according to this embodiment.

The iFFT unit 214 subjects the frequency spectrum data of each channel, generated by the L/R ch generation unit 213, to an inverse transform (an inverse FFT), to return the data to an audio signal in the original time series. The audio processing unit 215 carries out processing such as equalizing. The ALC (auto level controller) 216 adjusts the amplitude of each audio signal in time series to a predetermined level.

Through the above-described configuration, the audio input unit 102 subjects an audio signal to predetermined processing to form audio data, and sends and stores that data in the memory 103.

The mechanical structure of part of the audio input unit 102 according to this embodiment will be described next with reference to FIGS. 3A and 3B.

FIG. 3A is an external view of a housing of the image capturing apparatus according to this embodiment. When the image capturing apparatus is facing a subject to be shot, the reference sign "a" in a predetermined position on the right side as seen from the shooter indicates an input port (opening) for the main microphone 205a, and the reference sign "b" in the opposite position on the left side indicates an input port for the sub microphone 205b. The enlargement illustrated in FIG. 3A is the mechanical structure part of the main microphone 205a and the sub microphone 205b, which are parts of the audio input unit 102. FIG. 3B is a cross-sectional view illustrating the mechanical structure. The configuration includes a sheathing part 102-1 forming the microphone ports, a main microphone bushing 102-2a that holds the main microphone 205a, a sub microphone bushing 102-2b that holds the sub microphone 205b, and a pressure part 143 that presses and holds the microphone bushings against the sheathing part. The sheathing part 102-1 and the pressure part 143 are formed as molded members from a PC material or the like, but may be metal members formed from aluminum, stainless steel, or the like. The main microphone bushing 102-2a and the sub microphone bushing 102-2b are formed from a rubber material such as ethylene propylene diene rubber.

The diameters of the microphone ports in the sheathing part will be described here. The diameter of the microphone port to the sub microphone 205b (the area that is open) is smaller than the diameter of the microphone port to the main microphone 205a (the area that is open) by a predetermined scale factor. Although it is desirable for the microphone ports to be circular or elliptical in shape, the microphone ports may be quadrangular. The ports may have the same or different shapes as well. This configuration is employed in order to make it difficult for driving noise propagating through the air to the microphones within the image capturing apparatus from leaking to the exterior from the microphone port of the sub microphone 205b.

A space to the front of the microphones, formed by the sheathing part 102-1 and the microphone bushings, will be described next. The volume of the space to the front of the sub microphone 205b, formed by the sheathing part 102-1 and the sub microphone bushing 102-2b, is greater than the space to the front of the main microphone 205a, formed by the sheathing part 102-1 and the main microphone bushing 102-2a, with a volume of a predetermined scale factor being secured. This configuration is employed in order to increase atmospheric pressure changes within the space to the front of the sub microphone 205b and enhance the driving noise.

As described earlier, in the mechanical configuration of the microphone inputs, the input of the sub microphone 205b is configured to greatly enhance the amplitude of the driving noise as compared to the input of the main microphone 205a. The relationship between the sound levels of the driving noise input to the respective microphones is main microphone 205a<sub microphone 205b. However, note that the relationship between the levels of sound from outside the apparatus (the surrounding environment sound, which is the sound intended to be collected), which is input to the microphones by propagating through the air in front of the microphone ports, is main microphone 205a≥sub microphone 205b.

Operations of the stereo gain computation processing unit 211 in the audio input unit 102 according to this embodiment will be described next with reference to FIGS. 7 to 9.

FIG. 7 illustrates an example of a path of sound from the exterior to the microphones built into the image capturing apparatus 100, and a path of sound produced when driving the built-in optical lens 201. These microphones correspond to the main microphone 205a and the sub microphone 205b illustrated in FIG. 2. As illustrated in FIG. 7, the distance between the source of the surrounding environment sound and the image capturing apparatus 100 is much greater than the distance between the main microphone 205a and the sub microphone 205b. As such, the propagation path of the sound from the surrounding environment sound source to the main microphone 205a can be thought of as substantially identical to the propagation path of the sound from the surrounding environment sound source to the sub microphone 205b. However, the optical lens 201 built into the image capturing apparatus is close to the main microphone 205a and the sub microphone 205b. Furthermore, the distances between the motor for moving the optical lens 201 and the microphones may be unequal, and the paths of the sound within the image capturing apparatus may be different as well. As such, the respective paths of sound (distances) from the optical lens driving system to the main microphone 205a and the sub microphone 205b differ greatly. In other words, the Mch and Sch audio level differences differ greatly between the surrounding environment sound and the driving noise. For this reason, a large difference arises between the surrounding environment sound and the optical lens driving noise, which makes it easy to distinguish between the two.

On the other hand, it is difficult to determine whether the surrounding environment sound is coming from the left or right side using the Mch and Sch, based on the level alone. Accordingly, the surrounding environment sound can be determined using the phase of the audio signals. This will be described in detail next.

FIGS. 8A to 8C illustrate a relationship between given frequency spectrum data Main[n] and Sub[n].

The stereo gain computation processing unit 211 outputs the stereo Lch gain Gain_L[0]-[511] and Rch gain Gain_R[0]-[511] from the frequency spectrum data Main[0]-[511] obtained from the main microphone 205a and the frequency spectrum data Sub[0]-[511] obtained from the sub microphone 205b. The stereo gain computation processing unit 211 has the following configuration.

The phase difference determination unit 2111 calculates the phase information of the frequency spectrum data Sub[0]-[511] with respect to the frequency spectrum data Main[0]-[511].

When, for example, surrounding environment sound at a frequency point n comes from the main microphone 205a side, the relationship between V(Main[n]) and V(Sub[n]) is as illustrated in FIG. 8A. With the microphone arrangement according to this embodiment, the phase will not change even if the magnitude of the frequency spectrum changes. As such, the phase information is obtained by using the outer product of V(Main[n]) and V(Sub[n]) (that is, |V(Main[n])×V(Sub[n])|).

phase information[$n$]=|$V$(Main[$n$])×$V$(Sub[$n$])|/(|$V$(Main[$n$])|·|$V$(Sub[$n$])|)

The phase difference determination unit 2111 outputs the phase information [n] calculated through the above formula. The phase information [n] found here is thus sin θ of V(Main[n]) and V(Sub[n]), and when the surrounding environment sound comes from the main microphone 205a side (the right side of the user holding the image capturing apparatus 100), 0<phase information [n]≤1.

When the surrounding environment sound at frequency point n comes from the sub microphone 205b side, the relationship between V(Main[n]) and V(Sub[n]) corresponds to the frequency spectrum relationship indicated in FIG. 8B. With the microphone arrangement according to this embodiment, the phase will not change even if the magnitude of the frequency spectrum changes.

As such, the phase information is obtained by using the outer product of V(Main[n]) and V(Sub[n]) (that is, |V(Main[n])×V(Sub[n])|).

phase information[$n$]=|$V$(Main[$n$])×$V$(Sub[$n$])|/(|$V$(Main[$n$])|·|$V$(Sub[$n$])|)

The phase difference determination unit 2111 outputs the phase information [n] calculated through the above formula. The phase information [n] found here is thus sin θ of V(Main[n]) and V(Sub[n]), and when the surrounding environment sound comes from the sub microphone 205b side, 0>phase information [n]≥−1.

If the surrounding environment sound at frequency point n is an equal distance from the main microphone 205a and the sub microphone 205b, i.e., comes from the center of the optical lens 201, the relationship between V(Main[n]) and V(Sub[n]) corresponds to the frequency spectrum relationship indicated in FIG. 8C. With the microphone arrangement according to this embodiment, the phase will not change even if the magnitude of the frequency spectrum changes.

The phase information is obtained by using the outer product of V(Main[n]) and V(Sub[n]) (that is, |V(Main[n])×V(Sub[n])|).

phase information[$n$]=|$V$(Main[$n$])×$V$(Sub[$n$])|/(|$V$(Main[$n$])|·|$V$(Sub[$n$])|)

The phase difference determination unit 2111 outputs the phase information [n] calculated through the above formula. The phase information [n] found here is thus sin θ of V(Main[n]) and V(Sub[n]), and when the surrounding environment sound comes from the sub microphone 205b side, the phase information [n]≈0.

The stereo gain computation unit 2112 computes the stereo gain [0]-[511] using the phase information [0]-[511] determined as described above. For example, the stereo gain computation unit 2112 calculates the gain in each channel through the following formulas at frequency point n.

stereo gain for Lch generation=1+phase information [$n$]×enhancement coefficient stereo gain for Rch generation=1−phase information [$n$]×enhancement coefficient The stereo gain computation unit 2112 then outputs the stereo gain [n] for each channel calculated through the above formulas.

FIG. 9 is a diagram illustrating the enhancement coefficient used by the stereo gain computation unit 2112 at each frequency point.

Assuming the horizontal axis represents the frequency point and the vertical axis represents the enhancement coefficient, the enhancement coefficient for the frequency to be enhanced the most is a maximum value of 1.0, and the enhancement coefficient in low ranges where little phase difference arises and in high ranges where the phase difference cannot be determined is a minimum value of 0.

For example, the enhancement coefficient is 1.0 for 1 kHz to 5 kHz, which is to be enhanced the most, and is 0 for 200 Hz and lower.

The enhancement coefficient for high ranges where the phase difference cannot be determined is determined by the distance between the main microphone 205a and the sub microphone 205b. For example, assuming the distance between the main microphone 205a and the sub microphone 205b is 15 mm and the acoustic velocity is 340 m/s, it is possible that the correct phase information cannot be obtained and left and right will invert at frequencies of 11.3 kHz or higher, where the half-wavelength fits within 15 mm. The accuracy is low at frequencies of 5.7 kHz or greater, where the quarter-wavelength fits within 15 mm. Thus the enhancement coefficient is multiplied according to the frequency, as indicated in FIG. 9.

The operations of the driving noise computation processing unit 209, the total gain computation unit 212, and the L/R ch generation unit 213 of the audio input unit 102 according to this embodiment will be described next with reference to FIGS. 5, 10 to 13A and 13B.

Figure 10:
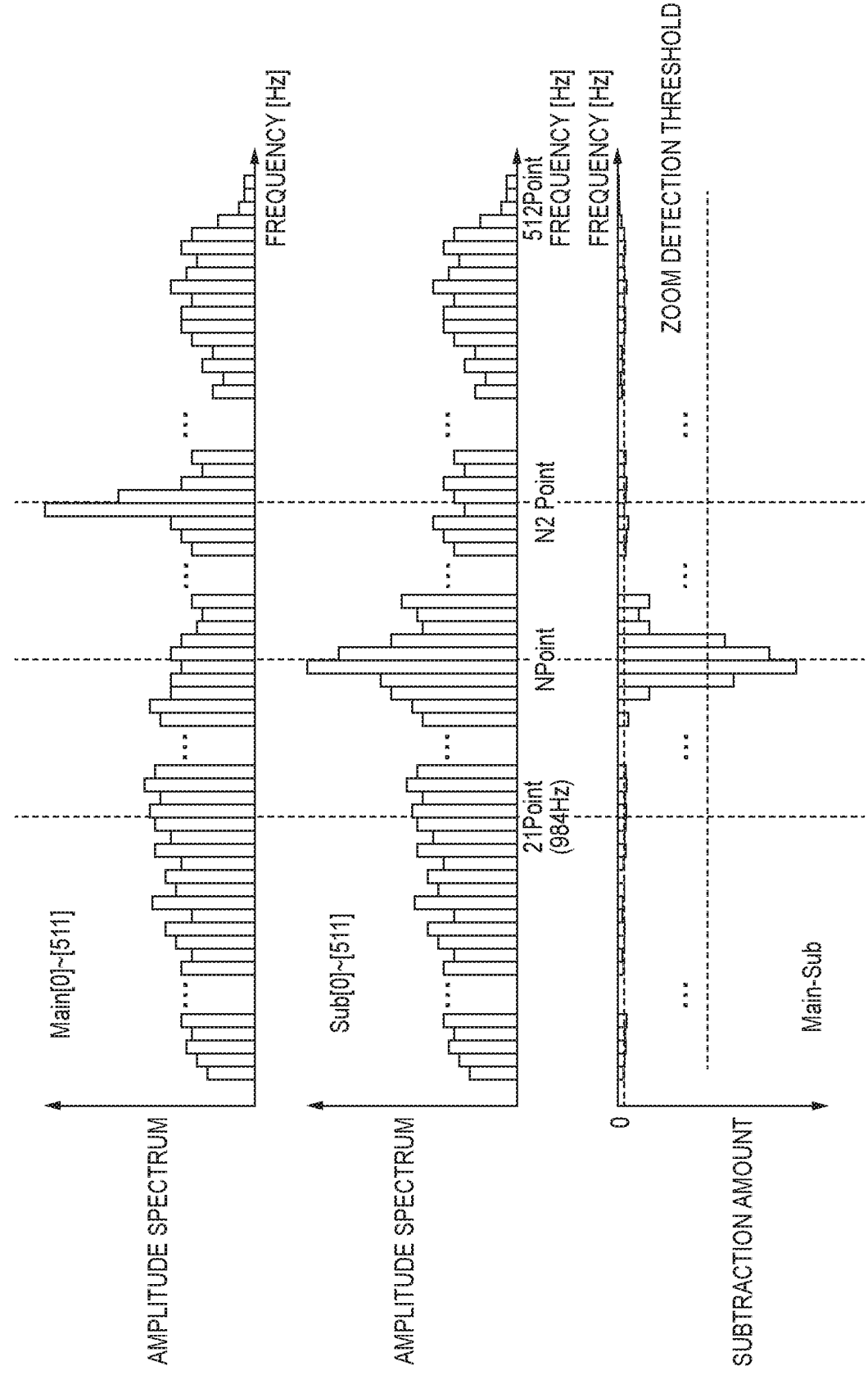
FIG. 10 is graphs illustrating amplitude spectra in each of frequencies for the main microphone a and the sub microphone b of the image capturing apparatus according to the embodiment.

FIG. 10 illustrates an example of amplitude spectrum data at each frequency for each of the main microphone 205a and the sub microphone 205b.

The FFT unit 207 transforms the audio signal in each channel into frequency spectra at 1024 points from 0 Hz to 48 kHz. The frequency spectrum data obtained from the transform has frequency spectra in 512 point up to the Nyquist frequency of 24 kHz.

As described earlier with reference to FIGS. 3A and 3B, the mechanical configuration of the microphone inputs in the image capturing apparatus 100 according to the embodiment means that the sub microphone 205b will generate a signal in which the amplitude of the driving noise is greatly enhanced compared to the main microphone 205a. In other words, the following relationships hold true in the amplitude spectrum:

surrounding environment sound level: main microphone 205a≥sub microphone 205b driving noise level: main microphone 205a<sub microphone 205b FIG. 10 illustrates an example of the amplitude spectrum data Main[ ] from the main microphone 205a and the amplitude spectrum data Sub[ ] from the sub microphone 205b. In FIG. 10, "Main-Sub" represents a subtraction amount [0]-[511] obtained by subtracting Sub[ ] from Main[ ], as computed by the Mch-Sch computation unit 2091.

For example, focusing on the amplitude spectra near the Nth point in the Sch, it can be said that Sch>Mch, i.e., that the point is a point where the driving noise is dominant. At this time, a subtraction amount that exceeds (or falls below) a predetermined zoom detection threshold is calculated for Main-Sub near the Nth point, and an amplitude spectrum treated as "driving noise" is detected near the Nth point. On the other hand, focusing on the amplitude spectrum at the N2th point in the Mch, Sch≤Mch. In other words, it can be said that the point is a point where the surrounding environment sound is dominant. At this time, a subtraction amount exceeding the zoom detection threshold is not calculated for Main-Sub, and thus the amplitude spectra near the N2th point are not detected as driving noise. The above-described computations are carried out for the entire amplitude spectrum range from [0] to [511].

FIG. 11 is a diagram illustrating the amplitude spectrum, in time series, as the Nth frequency point, for the sub microphone 205b.

In FIG. 11. "Sub ch" indicates that the amplitude spectrum data at the Nth point changes in time series.

Sch|$t_n-t_{(n-1)}$| indicates an amplitude variation amount between frames in the time direction computed by the time-based amplitude variation detection unit 2093 for the amplitude spectrum at a Sch Nth point, which is output as a time-based variation amount [n]. Focusing, for example, on the Sch amplitude spectrum from t1 to t2, there is a large variation amount in the time direction, and a time-based variation amount exceeding a variation amount detection threshold is calculated for Sch|$t_n-t_{(n-1)}$| from t1 to t2. This computation is carried out for all points in the amplitude spectrum from [0] to [511].

Figure 12A:
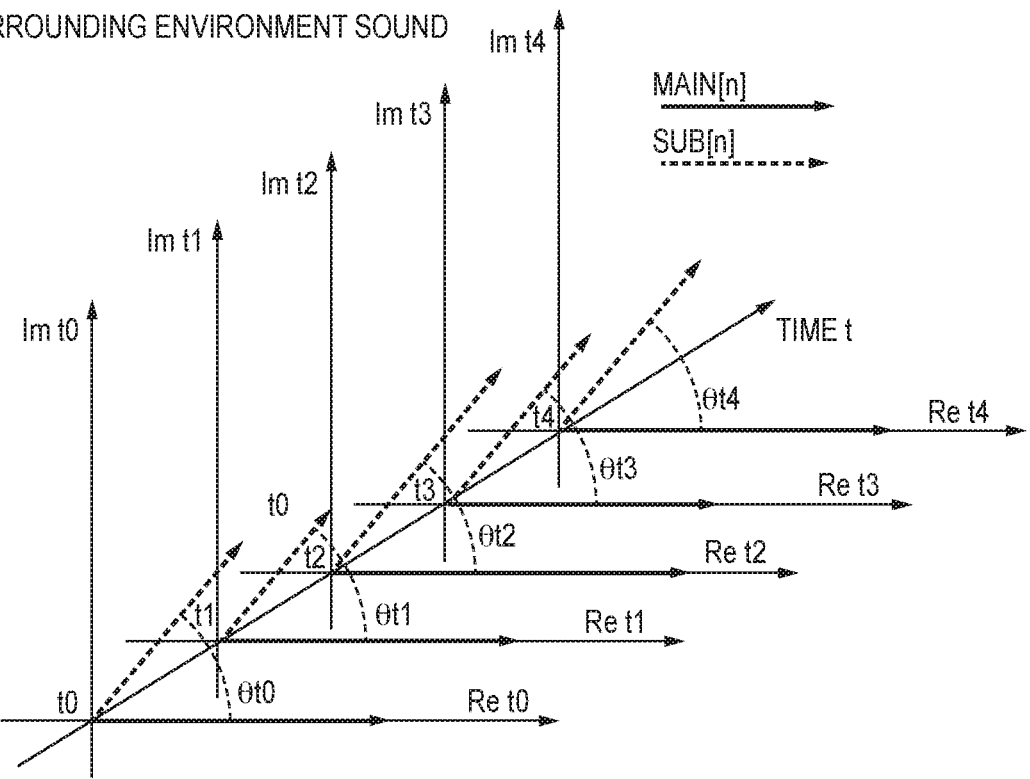
FIGS. 12A and 12B are graphs illustrating phases, in time series, of the main microphone a and the sub microphone b of the image capturing apparatus according to the embodiment.
Figure 12B:
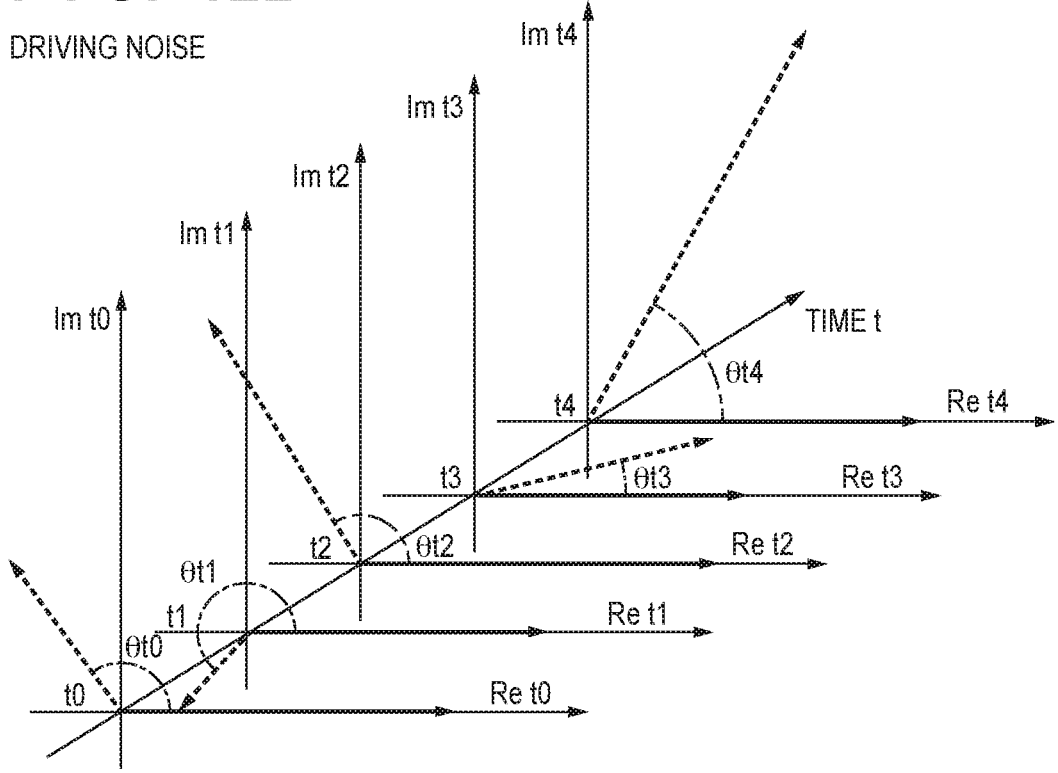

FIGS. 12A and 12B are diagrams indicating the phase, in time series, at the Nth point in the frequency, for the amplitude spectrum from the main microphone 205a and the amplitude spectrum from the sub microphone 205b.

FIG. 12A indicates changes in the phase of "surrounding environment sound" in the time direction through complex planes Im and Re, where the solid lines represent Mch and the dotted lines represent Sch. to, t1, t2, t3, and t4 represent transitions in the time direction.

FIG. 12B illustrates changes in the phase of "driving noise".

Here, for the surrounding environment sound, the phase of Mch and Sch is constant in the transition of time from t0 to t4. For the driving noise, however, the phase of Mch and Sch varies greatly in the transition of time from t0 to t4. The variations in phase in the time direction are detected by the time-based phase variation detection unit 2094, and are output as the time-based phase variation amount [n]. The time-based phase variation detection unit 2094 carries out these computations for all frequency points in the amplitude spectra from [0] to [511].

FIGS. 13A and 13B illustrate examples of an operation timing chart of the Mch-Sch computation unit 2091.

In FIG. 13A, Main[N], Sub[N], and Main[N]-Sub[N] represent the amplitude spectrum data of the Mch, the amplitude spectrum data of the Sch, and the subtraction amount [N] obtained by subtracting the Sch amplitude spectrum from the Mch amplitude spectrum, respectively, at the Nth frequency point. Main[N]-Sub[N] is output as the result of the computation carried out by the Mch-Sch computation unit 2091.

Focusing on the period from t1 to t2 in FIG. 13A, the Sub[N] amplitude spectrum is much greater than Main[N], and the result of the computation of Main[N]-Sub[N] exceeds the zoom threshold. This is therefore detected as driving noise, and the subtraction amount [N] is output.

In FIG. 13B, Main[N2], Sub[N2], and Main[N2]-Sub[N2] represent the Mch amplitude spectrum, the Sch amplitude spectrum, and the subtraction amount [n] obtained by subtracting the Sch amplitude spectrum from the Mch amplitude spectrum, respectively, at the N2th point in the frequency. Here, focusing on the period from t1 to t2 in FIG. 13B. Main[N2] and Sub[N2] vary at the same level, and the result of the computation of Main[N2]-Sub[N2] does not exceed the zoom threshold. Thus driving noise is not detected at the N2th point of the frequency. The Mch-Sch computation unit 2091 carries out the computations indicated in the above-described timing charts for all of the amplitude spectra from [0] to [511].

Figure 5:
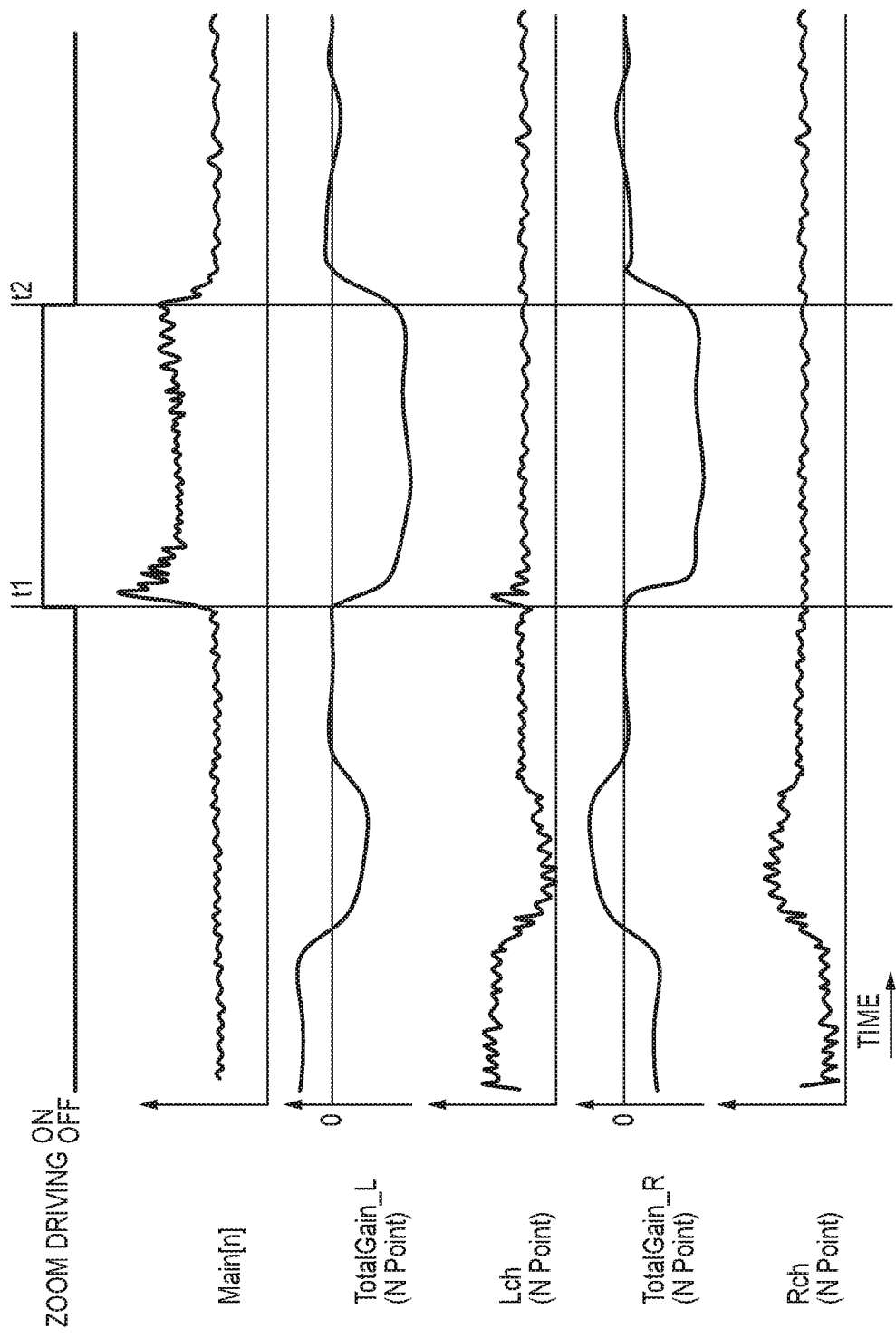
FIG. 5 is a timing chart for a L/R ch generation unit of the image capturing apparatus according to the embodiment.

FIG. 5 illustrates an example of a timing chart of the L/R ch generation unit 213. The zoom driving operations are driving operations carried out by the optical lens 201 from time t1 to t2 under the control of the control unit 109. In FIG. 5, Mch spectrum indicates the spectrum at the Nth point in an extracted specific frequency. Lch and Rch are generated by adding Total_Gain_L and Total_Gain_R, which have been determined by the total gain computation unit 212, to Mch. As indicated by the timing chart in FIG. 5, for example, Rch can be enhanced by lowering Total_Gain_L and raising Total_Gain_R for the Mch, and thus a 2ch stereo signal can be generated with 1ch input.

In the optical lens driving operations from t1 to t2, too, the driving noise can be removed from the Lch and Rch by lowering Total_Gain_L and Total_Gain_R.

Operations of the sensitivity difference correction unit 208 in the audio input unit 102 according to this embodiment will be described next with reference to FIG. 14.

FIG. 14 illustrates an example of an operation timing chart of the sensitivity difference correction unit 208. In FIG. 14, "zoom detection" indicates a result of the driving detection unit 2095 detecting the driving noise. "Input spectrum N point" indicates the Mch amplitude spectrum and the Sch amplitude spectrum at the Nth frequency point. The solid line represents Mch, and the dotted line represents Sch.

"Input spectrum (integrated) NPoint" represents a result of the sensitivity correction integrator 2081 integrating Mch and Sch at the Nth frequency point. "Sensitivity-adjusted output spectrum NPoint" represents the Mch amplitude spectrum and the Sch amplitude spectrum whose levels have been corrected by the sensitivity difference correction gain unit 2085 at the Nth frequency point. The solid line represents Mch, and the dotted line represents Sch.

In FIG. 14, t0 represents the timing at which recording is started, and t0 to t1 represents a sufficiently long time, e.g. approximately several tens of seconds. Zoom detection is on from time t2 to t3, which indicates that the driving detection unit 2095 has detected driving noise.

In the input spectrum NPoint, a level difference is present between Mch and Sch at the recording start time t0. However, the input spectrum (integrated) NPoint gradually tracks the level difference from t0 to t1 integrated by the sensitivity correction integrator 2081. In the sensitivity-adjusted output spectrum NPoint, too, gain correction is applied to the integration result in input spectrum (integrated) NPoint by the sensitivity difference correction gain unit 2085 over a sufficient time from t0 to t1. This is done for the sensitivity difference correction unit 208 to correct the sensitivity of the main microphone 205a and the sub microphone 205b, and thus the level correction may be carried out over a sufficient amount of time, e.g., approximately several tens of seconds, and transitional responsiveness is not required.

In the zoom detection on period from time t2 to t3, the sensitivity correction integrator 2081 is stopped. Thus although a large level difference arises between the Mch amplitude spectrum and the Sch amplitude spectrum due to driving noise, the sensitivity correction integrator 2081 is stopped, and the value is maintained without tracking the level difference. As described earlier, the purpose of the sensitivity difference correction unit 208 is to correct the sensitivities of the main microphone 205a and the sub microphone 205b, and thus it is not necessary to respond to transitional level differences caused by driving noise. The sensitivity difference correction unit 208 carries out the correction indicated in the above-described timing chart on all the amplitude spectra from [0] to [511].

Operations of the wind noise computation processing unit 210 in the audio input unit 102 according to this embodiment will be described next with reference to FIGS. 15 to 17.

Figure 15:
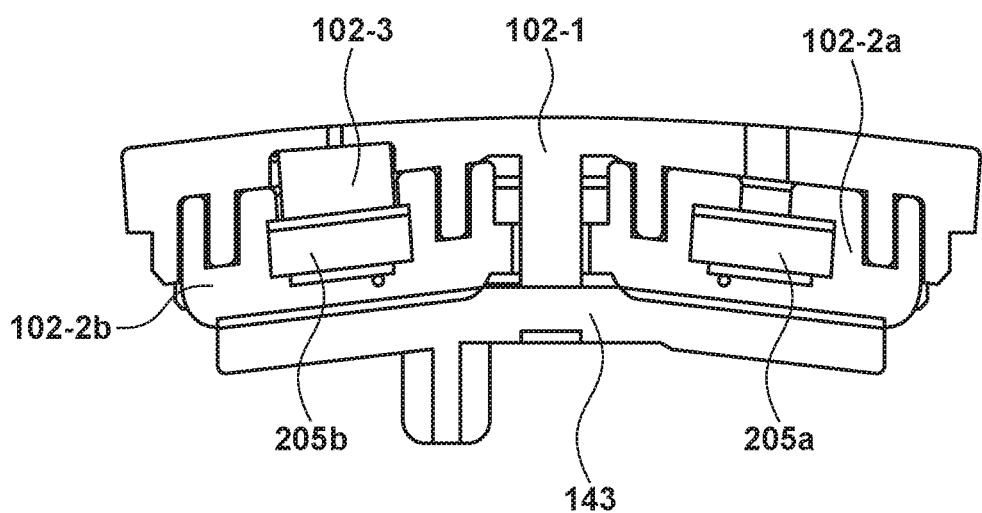
FIG. 15 is a diagram illustrating the mechanical structure of the audio input unit of the image capturing apparatus according to the embodiment.

FIG. 15 is a cross-sectional view of the mechanical structure of an anti-wind member 102-3 for the sub microphone 205b, which is a part of the audio input unit 102.

The configuration includes the sheathing part 102-1 forming the microphone ports, the main microphone bushing 102-2a that holds the main microphone 205a, the sub microphone bushing 102-2b that holds the sub microphone 205b, and the pressure part 143 that presses and holds the microphone bushings against the sheathing part. The sheathing part 102-1 and the pressure part 143 are formed as molded members from a PC material or the like, but may be metal members formed from aluminum, stainless steel, or the like. The main microphone bushing 102-2a and the sub microphone bushing 102-2b are formed from a rubber material such as ethylene propylene diene rubber.

The diameters of the microphone ports in the sheathing part 102-1 will be described here. The diameter of the microphone port to the sub microphone 205b is smaller than the diameter of the microphone port to the main microphone 205a. In this embodiment, the diameter of the microphone port for the sub microphone 205b is ⅓ the diameter of the microphone port for the main microphone 205a. Although it is desirable for the microphone ports to be circular or elliptical in shape, the microphone ports may be quadrangular. The ports may have the same or different shapes as well.

The arrangement of a space to the front of the microphones, formed by the sheathing part 102-1 and the microphone bushings 102-2a and 102-2b and a cushioning material will be described next. The volume of the space to the front of the sub microphone 205b, formed by the sheathing part 102-1 and the sub microphone bushing 102-2b, is greater than the space to the front of the main microphone 205a, formed by the sheathing part 102-1 and the main microphone bushing 102-2a, with three times the volume secured.

In the space to the front of the sub microphone 205b, formed by the sheathing part 102-1 and the sub microphone bushing 102-2b, an anti-wind cushioning material or a sealed microphone is arranged as the anti-wind member 102-3. Both are formed as members that filter signal components in a low-frequency range, e.g., approximately 0 to 4 kHz, which corresponds to the frequencies of wind. The anti-wind member 102-3 makes it possible to greatly reduce the effects of wind noise, in which the low-frequency range is dominant, on the air propagation to the sub microphone 205b.

Figure 16:
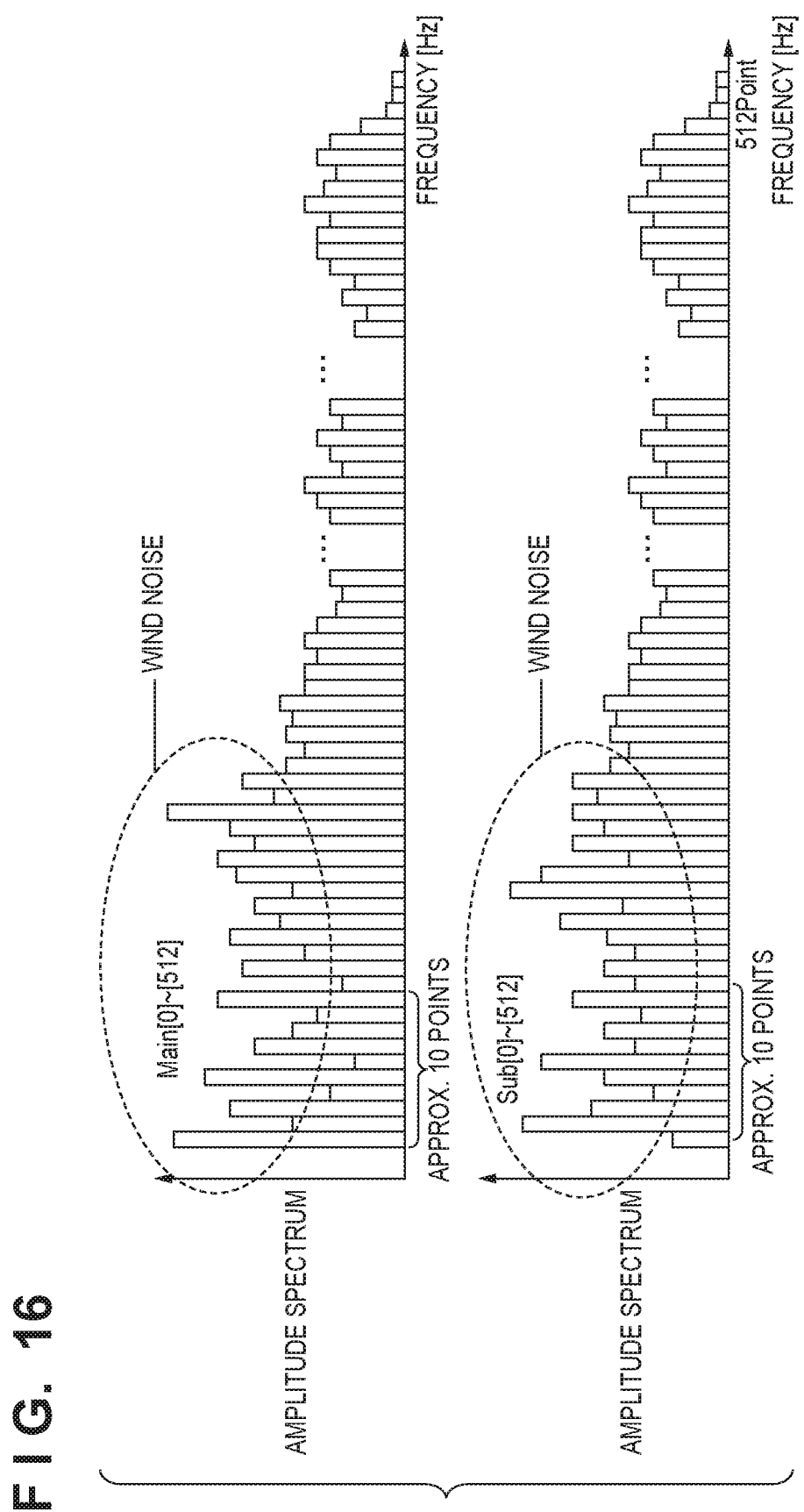
FIG. 16 is graphs illustrating a frequency spectrum from the main microphone a and a frequency spectrum from the sub microphone b of the image capturing apparatus according to the embodiment.

FIG. 16 illustrates the frequency spectrum data Main[0]-[511] from the main microphone 205a and the frequency spectrum data Sub[0]-[511] from the sub microphone 205b when wind noise is input. When wind noise is input, the wind noise component is present in the low-frequency range indicated by the dotted line area. The wind detection unit 2101 detects the wind noise level on the basis of the correlation of, for example, 10 points in the low-frequency ranges of the frequency spectrum data Main[0]-[511] from the main microphone 205a and the frequency spectrum data Sub[0]-[511] from the sub microphone 205b. The wind detection unit 2101 calculates and outputs the wind noise level according to the following formula, for a low-frequency point n, for example, $$\text{wind noise level} = \Sigma(\text{Main}[n] - \text{Sub}[n]) / (\text{Main}[n] + \text{Sub}[n])$$

The above formula uses 10 points for the low-frequency components, and thus n is in a range from 0 to 9. Although this embodiment describes the low-frequency range has having 10 points, this number is merely an example. It is desirable that the value be changed as appropriate in accordance with the design of the image capturing apparatus.

FIG. 17 illustrates a frequency relationship of the wind noise gain [0]-[511], computed by the wind noise gain computation unit 2102, with respect to the wind noise level from the wind detection unit 2101. As the wind noise level from the wind detection unit 2101 increases, the wind noise gain shifts toward the negative side, and a cutoff frequency represented by the dotted line shifts toward a high-frequency range. The wind noise gain [0]-[511] is determined by the cutoff frequency.

Operations of the Mch/Sch selection unit 2131 in the audio input unit 102 according to this embodiment will be described with reference to FIGS. 18A and 18B.

Figure 18A:
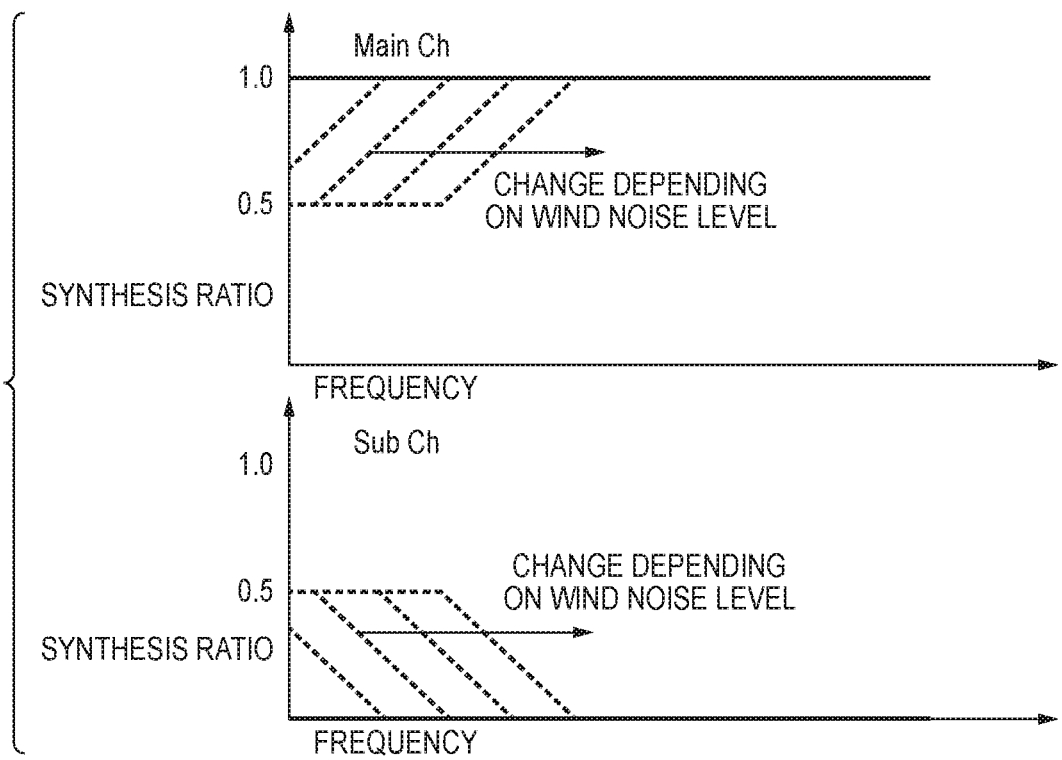
FIGS. 18A and 18B are graphs illustrating a relationship between frequency and a ratio at which the frequency spectrum from the main microphone a and the frequency spectrum from the sub microphone b of the image capturing apparatus are combined, according to the embodiment.

FIG. 18A illustrates the relationship between frequency and a synthesis ratio, based on the wind noise level, at which the frequency spectrum data Main[0]-[511] from the main microphone 205a ("Main ch" in FIG. 18A) and the frequency spectrum data Sub[0]-[511] from the sub microphone 205b ("Sub ch" in FIG. 18A) are synthesized by the Mch/Sch selection unit 2131.

Here, FIG. 18A illustrates an embodiment corresponding to the mechanical structure of the main microphone 205a and the sub microphone 205b illustrated in FIG. 3B. As illustrated in FIG. 18A, the Mch/Sch selection unit 2131 synthesizes the Main ch at a ratio of from 1.0 to 0.5 and the Sub ch at a ratio of from 0 to 0.5 on the basis of the wind noise level.

As the wind noise level increases, the synthesis ratio for the Main ch is reduced from 1.0 toward 0.5 and the synthesis ratio for the Sub ch is raised from 0 toward 0.5, and the crossover frequency at which the Main ch and the Sub ch are synthesized (an upper limit frequency for the synthesis) is raised. The Mch/Sch selection unit 2131 then synthesizes the Main ch and the Sub ch at the illustrated ratio at frequencies less than or equal to the upper limit frequency, which is dependent on the wind noise level, and selects and outputs the Main ch at frequencies higher than the upper limit frequency. The synthesis ratio of Sch is 0 when the wind noise level is 0. As illustrated in FIG. 3B, the diameter of the microphone port to the sub microphone 205b is smaller than the diameter of the microphone port to the main microphone 205a, namely, is reduced by ⅓. Thus the wind noise has less of an effect on the sub microphone 205b than the main microphone 205a. Accordingly, an effect of reducing the wind noise can be achieved by synthesizing the Sch with the Mch in accordance with the wind noise level from the wind detection unit 2101.

Figure 18B:
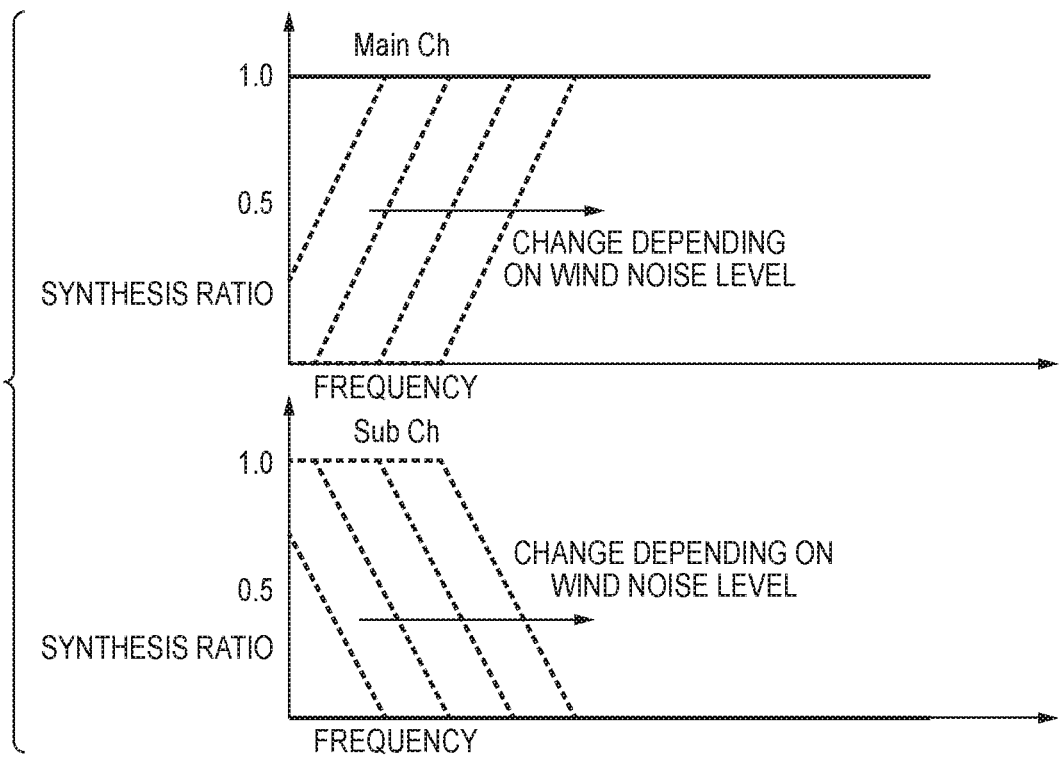

Next, FIG. 18B illustrates an embodiment corresponding to the mechanical configuration where the anti-wind member 102-3 is provided for the sub microphone 205b, as illustrated in FIG. 15. Here, the Mch/Sch selection unit 2131 synthesizes Mch at a ratio from 1.0 to 0 and Sch at a ratio from 0 to 1.0, on the basis of the wind noise level. In other words, as the wind noise level increases, the synthesis ratio for Mch is reduced from 1.0 toward 0 and the synthesis ratio for Sch is raised from 0 toward 1.0, and the crossover frequency for synthesizing Mch and Sch is raised. The synthesis ratio of Sch is 0 when the wind noise level is 0. As illustrated in FIGS. 3A and 15, the diameter of the microphone port to the sub microphone 205b is smaller than the diameter of the microphone port to the main microphone 205a, namely, is reduced by ⅓. Additionally, the anti-wind member 102-3 is provided in the space to the front of the sub microphone 205b, which is formed by the sheathing part 102-1 and the sub microphone bushing 102-2b. Thus the effect of the wind noise on the sub microphone 205b compared to the main microphone 205a can be reduced even more. Accordingly, an effect of reducing the wind noise can be achieved by switching from the Mch to the Sch in accordance with the wind noise level from the wind detection unit 2101.

Operations of the stereo suppression unit 2113 in the audio input unit 102 according to this embodiment will be described in detail next with reference to FIGS. 19 and 20.

Figure 19:
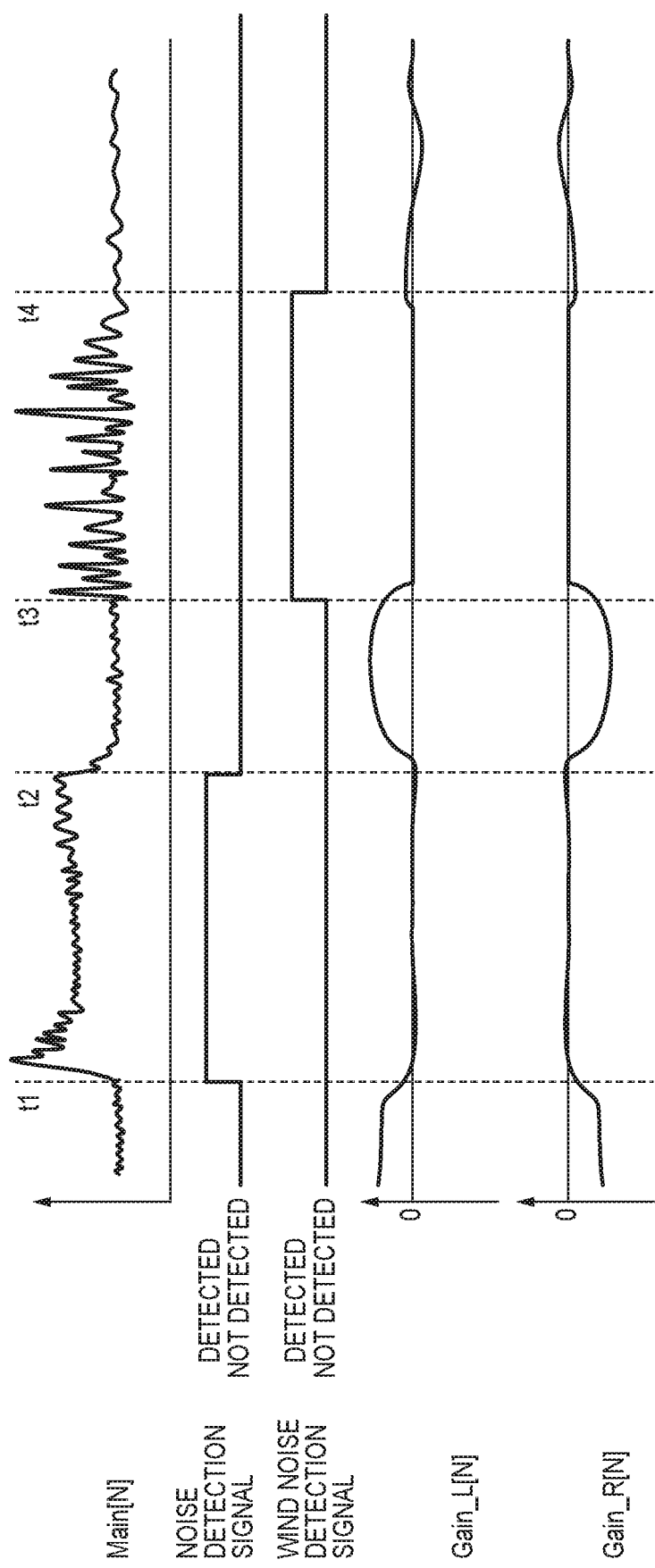
FIG. 19 is a timing chart illustrating how the enhancement coefficient used to enhance a stereo effect changes between when driving noise is being detected and when wind noise is being detected, for a stereo suppression unit of the image capturing apparatus according to the embodiment.

FIG. 19 is a timing chart illustrating how the enhancement coefficient used to enhance the stereo effect changes between when driving noise is being detected and when wind noise is being detected, for the stereo suppression unit 2113. In FIG. 19, "Main[N]" represents the Mch amplitude spectrum data for the Nth frequency point. "Driving noise detection signal" represents the detection signal indicating that driving noise has been detected by the driving detection unit 2095. "Wind noise detection signal" represents the wind noise level indicating that wind noise has been detected by the wind detection unit 2101 (a wind noise level greater than or equal to a pre-set threshold). "GainL[N]" and "GainR[N]" represent the stereo Lch and Rch gain added to the Mch amplitude spectrum at the Nth frequency point, determined by the stereo gain computation processing unit 211.

The stereo suppression unit 2113 sets the enhancement coefficient to 0 when the detection signal indicating that driving noise has been detected has been received from the Mch-Sch computation unit 2091. The stereo suppression unit 2113 also sets the enhancement coefficient to 0, in accordance with the frequency, when the wind noise level indicating that wind noise has been detected has been received from the wind detection unit 2101.

Here, focusing on the period from time t1 to t2, the Main[N] amplitude spectrum varies greatly, and the detection signal from the Mch-Sch computation unit 2091 indicates that driving noise is detected. The GainL[N] and GainR[N] are fixed at 0 during this period. In other words, this indicates that the stereo suppression unit 2113 has set the enhancement coefficient to 0. Focusing on the period from time t3 to t4, the Main[N] amplitude spectrum varies greatly, and the wind noise detection signal from the wind detection unit 2101 indicates detection. The GainL[N] and GainR[N] are fixed at 0 during this period. In other words, this indicates that the stereo suppression unit 2113 has set the enhancement coefficient to 0.

Figure 20:
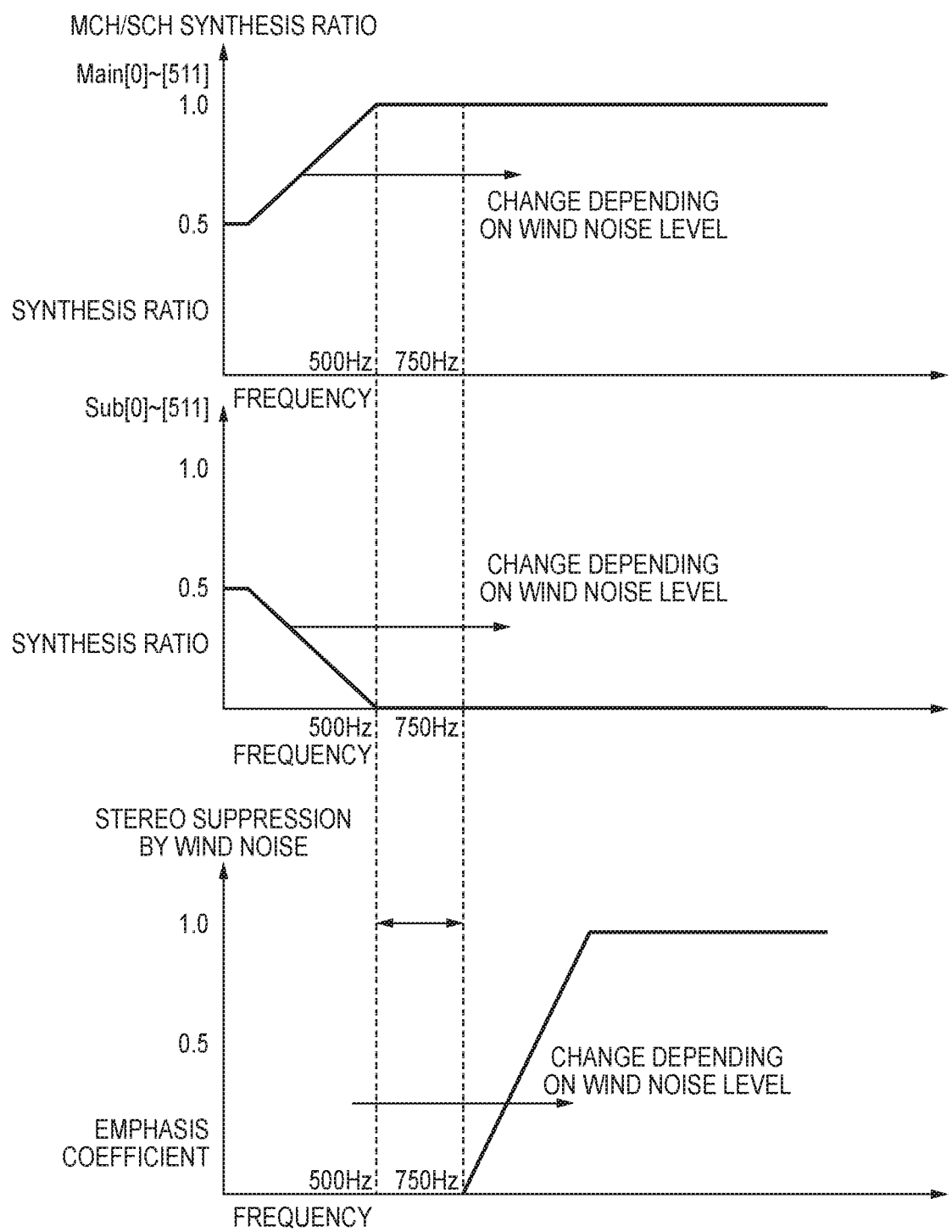
FIG. 20 is a diagram illustrating a relationship, when detecting wind noise, between a synthesis ratio, frequency, and the enhancement coefficient used to enhance the stereo effect, according to the embodiment.
Figure 21A:
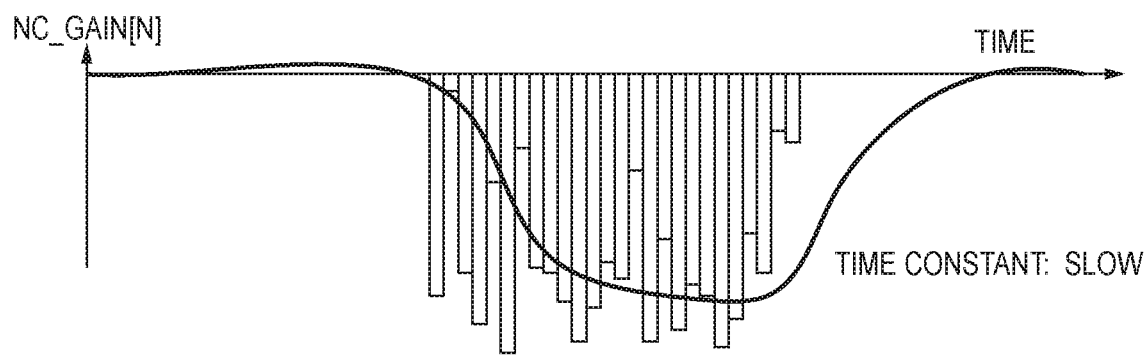
FIGS. 21A to 21D are graphs illustrating time constants of a driving noise removal gain, a wind noise subtraction amount, an Lch generation stereo gain, and an Rch generation stereo gain, according to the embodiment.
Figure 21B:
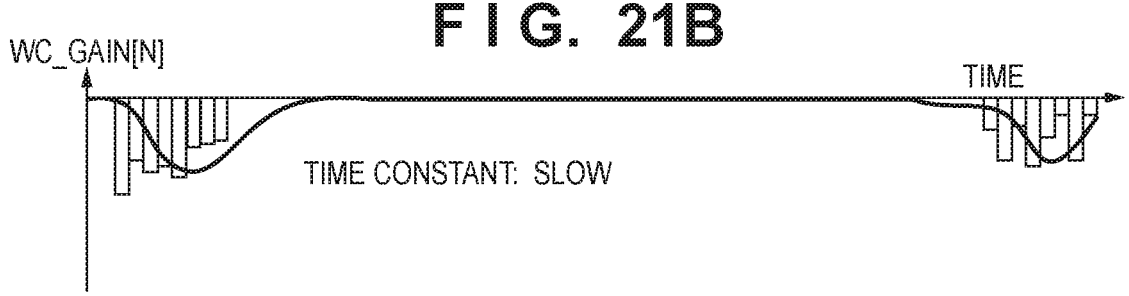
Figure 21C:
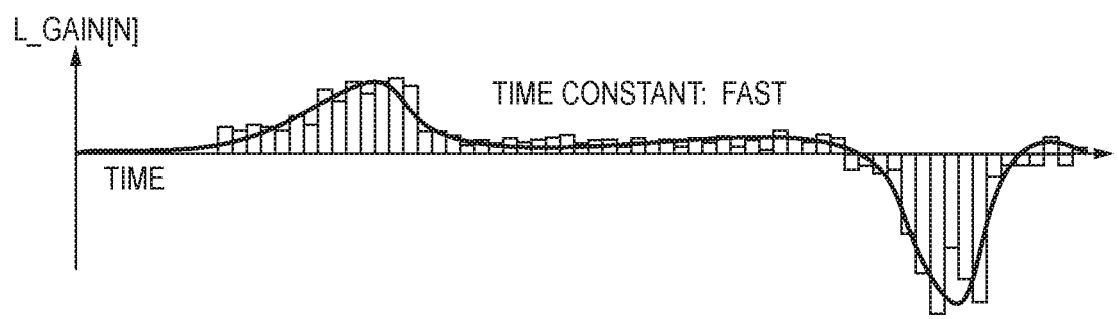
Figure 21D:
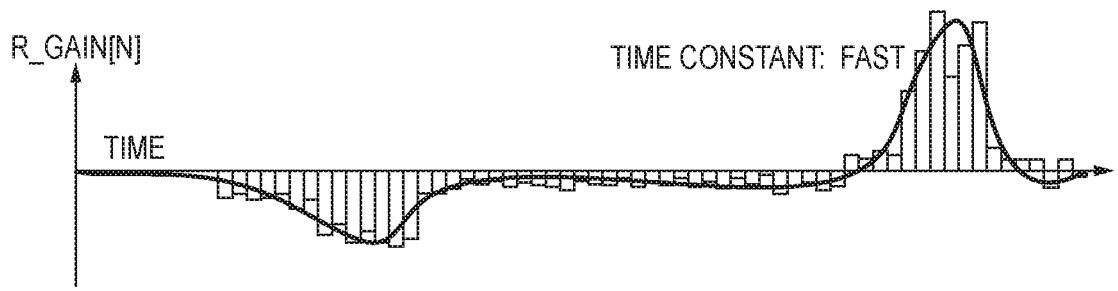

FIG. 20 is a diagram illustrating a relationship, when the wind noise level from the wind detection unit 2101 is detected, between the ratio at which the Mch/Sch selection unit 2131 synthesizes the frequency spectrum data Main[0]-[511] from the main microphone 205a and the frequency spectrum data Sub[0]-[511] from the sub microphone 205b, and the frequency at which the stereo suppression unit 2113 sets the enhancement coefficient to 0, with respect to frequency. Here, based on the wind noise level, as the wind noise level increases, the Mch/Sch selection unit 2131 reduces the synthesis ratio for Mch from 1.0 toward 0.5 and raises the synthesis ratio for Sch from 0 toward 0.5, and raises the crossover frequency for synthesizing Mch and Sch. With the wind noise level, the crossover frequency is 500 Hz. However, the stereo suppression unit 2113 fixed the enhancement coefficient at 0 up to a frequency of 750 Hz, which is higher than the crossover frequency. The stereo suppression unit 2113 raises the frequency at which the enhancement coefficient is set to 0 as the wind noise level from the wind detection unit 2101 increases. The enhancement by the stereo gain of GainL and GainR prevents the wind noise from being enhanced as well.

Operations of the driving noise subtraction amount integrator 2097, wind noise subtraction amount integrator 2103, the left gain integrator 2114, and the right gain integrator 2115 in the audio input unit 102 according to this embodiment will be described next with reference to FIGS. 21A to 21D.

FIGS. 21A to 21D illustrate time constants for each of a driving noise removal gain NC_GAIN[N], a wind noise subtraction amount WC_GAIN[N], a Lch generation stereo gain L_GAIN[N], and a Rch generation stereo gain R_GAIN[N] determined for the Mch amplitude spectrum data at the Nth frequency point. These are determined by the driving noise subtraction amount integrator 2097, the wind noise subtraction amount integrator 2103, the left gain integrator 2114, and the right gain integrator 2115. The time constant of the driving noise subtraction amount integrator is slower than the time constants of the right gain integrator 2115 and the left gain integrator 2114, and the time constant of the wind noise subtraction amount integrator is slower than the time constants of the right gain integrator 2115 and the left gain integrator 2114. The driving noise and the wind noise are both driving noise components, and have high levels of variation in time series. The variation is suppressed by reducing the time constants to delay the tracking of the driving noise subtraction and the wind noise subtraction. With respect to the stereo gain, making the time constant faster speeds up the tracking of the movement of the subject producing the sound.

Although this embodiment describes a situation where two types of sound are input, the embodiment can be applied even when there are more than two channels.

Additionally, although this embodiment describes an image capturing apparatus, the audio processing by the audio input unit 102 according to this embodiment can be applied in any apparatus that records or inputs outside sound, i.e., any sound recording apparatus. For example, the embodiment may be applied in an IC recorder, a mobile telephone, or the like.

Finally, although the embodiment describes an example in which the configuration illustrated in FIG. 6 is implemented using hardware, many of the processing units aside from the microphones, AD converters, and so on illustrated in FIG. 6 may be implemented using programs such as procedures or subroutines executed by a processor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-111161, filed Jun. 5, 2017, which is hereby incorporated by reference herein in its entirety.

What is claimed is:

1. An audio processing apparatus comprising:
a driving mechanism;
a first microphone that primarily obtains sound from outside the audio processing apparatus;
a second microphone that primarily obtains driving noise produced by the driving mechanism;
one or more processors; and
a memory coupled to the one or more processors, the memory having stored thereon instructions which, when executed by the one or more processors, causes the audio processing apparatus to function as:
a transform unit that transforms time series audio data obtained from the first microphone into first frequency spectrum data and transforms time series audio data obtained from the second microphone into second frequency spectrum data;
a driving noise computation processing unit that computes a subtraction amount of the driving noise for each of frequencies from the first frequency spectrum data and the second frequency spectrum data obtained by the transform unit;
a generating unit that, on the basis of the first frequency spectrum data and the second frequency spectrum data obtained by the transform unit and the driving noise subtraction amount obtained by the driving noise computation processing unit, generates left channel frequency spectrum data and right channel frequency spectrum data in which the driving noise is respectively suppressed; and
inverse transform unit that inverse-transforms the left channel frequency spectrum data and right channel frequency spectrum data generated by the generating unit into left channel time series audio data and right channel time series audio data, respectively,
wherein the generating unit generates the left channel frequency spectrum data and the right channel frequency spectrum data by applying different gains to the first frequency spectrum data.

2. The audio processing apparatus according to claim 1, wherein the generating unit includes a gain determining unit that, on the basis of the first frequency spectrum data and the second frequency spectrum data obtained by the transform unit and the driving noise subtraction amount obtained by the driving noise computation processing unit, determines a gain for the right channel and a gain for the left channel; and
the generating unit generates right channel frequency spectrum data by controlling the first frequency spectrum data using the right channel gain determined by the gain determining unit, and generates left channel frequency spectrum data by controlling the first frequency spectrum data using the left channel gain determined by the gain determining unit.

3. The audio processing apparatus according to claim 1, wherein the driving noise computation processing unit includes:
a subtraction unit that subtracts the second frequency spectrum data from the first frequency spectrum data;

a first detection unit that detects amplitude variation amounts over time in the first frequency spectrum data and the second frequency spectrum data, respectively; and a second detection unit that detects phase variation amounts in the first frequency spectrum data and the second frequency spectrum data, respectively, and the subtraction amount of the driving noise for each of the frequencies is calculated on the basis of a result of the subtraction by the subtraction unit, the amplitude variation amount detected by the first detection unit, and the phase variation amount detected by the second detection unit.

4. The audio processing apparatus according to claim 3, wherein the driving noise computation processing unit calculates the subtraction amount under a condition that the result of the subtraction by the subtraction unit is less than a pre-set negative threshold.

5. The audio processing apparatus according to claim 4, wherein in the case where the amplitude variation amount for each of the frequencies exceeds a pre-set threshold, the first detection unit calculates the subtraction amount of the driving noise for a frequency corresponding to a phase variation amount exceeding the threshold.

6. The audio processing apparatus according to claim 3, wherein the subtraction unit that subtracts the second frequency spectrum data from the first frequency spectrum data at each of frequency points.

7. The audio processing apparatus according to claim 3, wherein the first detection unit detects the amplitude variation amount at each of frequency points.

8. The audio processing apparatus according to claim 3, wherein the second detection unit detects the phase variation amount at each of frequency points.

9. The audio processing apparatus according to claim 3, wherein the driving noise computation processing unit further calculates the driving noise subtraction amount on the basis of a variation amount in an amplitude of the second frequency spectrum data over time.

10. The audio processing apparatus according to claim 2, wherein the generating unit determines a gain at each of frequency points for the right channel and a gain at each of frequency points for the left channel.

11. A control method for an audio processing apparatus, the audio processing apparatus comprising a driving mechanism, a first microphone that primarily obtains sound from outside the audio processing apparatus, and a second microphone that primarily obtains driving noise produced by the driving mechanism, and the method comprising:

transforming time series audio data obtained from the first microphone into first frequency spectrum data and transforming time series audio data obtained from the second microphone into second frequency spectrum data;

computing a subtraction amount of the driving noise for each of frequencies from the first frequency spectrum data and the second frequency spectrum data obtained in the transforming;

generating, on the basis of the first frequency spectrum data and the second frequency spectrum data obtained in the transforming and the driving noise subtraction amount obtained in the computing, left channel frequency spectrum data and right channel frequency spectrum data in which the driving noise is respectively suppressed, wherein the left channel frequency spectrum data and the right channel frequency spectrum data is generated by applying different gains to the first frequency spectrum data; and inverse-transforming the left channel frequency spectrum data and right channel frequency spectrum data generated in the generating into left channel time series audio data and right channel time series audio data, respectively.

12. An audio processing apparatus comprising:
a housing;
a driving unit;
a first microphone housed within the housing so that sound propagates through a first opening provided in a first predetermined position of the housing;
a second microphone to which sound propagates through a second opening provided in a second predetermined position of the housing related to the first predetermined position and that has a smaller area than the first opening, the second microphone being housed within the housing so that a volume of a second space between the second microphone and the second opening is greater than a volume of a first space between the first microphone and the first opening;
a transform unit that transforms time series audio data obtained from the first microphone into first frequency spectrum data and transforms time series audio data obtained from the second microphone into second frequency spectrum data;
a calculation unit that calculates an amount of driving noise produced by the driving unit at each of frequencies from the first frequency spectrum data and the second frequency spectrum data obtained by the transform unit;
a generating unit that, on the basis of the first frequency spectrum data, the second frequency spectrum data, and the amount of driving noise calculated by the calculation unit, generates left channel frequency spectrum data and right channel frequency spectrum data in which the driving noise is respectively suppressed; and
an inverse transform unit that inverse-transforms the left channel frequency spectrum data and right channel frequency spectrum data generated by the generating unit into left channel time series audio data and right channel time series audio data, respectively.

13. The audio processing apparatus according to claim 12, further comprising:
a first microphone bushing that holds the first microphone; and
a second microphone bushing that holds the second microphone,
wherein the first space is formed by the housing and the first microphone bushing; and
the second space is formed by the housing and the second microphone bushing.

14. The audio processing apparatus according to claim 12, wherein the driving noise propagating to the second microphone through the second space is greater than the driving noise propagating to the first microphone through the first space.

15. The audio processing apparatus according to claim 12, wherein the first microphone is a microphone corresponding to one of the left channel and the right channel, and the second microphone is a microphone corresponding to the other of the left channel and the right channel.

16. The audio processing apparatus according to claim 12, wherein on the basis of the first frequency spectrum data, the second frequency spectrum data, and the amount of the driving noise calculated by the calculation unit, the generating unit determines gains for the right channel and the left channel, respectively, generates the right channel frequency spectrum data by controlling the first frequency spectrum data using the right channel gain, and generates the left channel frequency spectrum data by controlling the first frequency spectrum data using the left channel gain.

17. A control method for an audio processing apparatus, the audio processing apparatus comprising:

a housing;

a driving unit;

a first microphone housed within the housing so that sound propagates through a first opening provided in a first predetermined position of the housing; and a second microphone to which sound propagates through a second opening provided in a second predetermined position of the housing related to the first predetermined position and that has a smaller area than the first opening, the second microphone being housed within the housing so that a volume of a second space between the second microphone and the second opening is greater than a volume of a first space between the first microphone and the first opening, and the method comprising:

transforming time series audio data obtained from the first microphone into first frequency spectrum data and transforming time series audio data obtained from the second microphone into second frequency spectrum data;

calculating an amount of driving noise produced by the driving unit at each of frequencies from the first frequency spectrum data and the second frequency spectrum data obtained in the transforming;

generating, on the basis of the first frequency spectrum data, the second frequency spectrum data, and the amount of driving noise calculated in the calculating, left channel frequency spectrum data and right channel frequency spectrum data in which the driving noise is respectively suppressed; and inverse-transforming the left channel frequency spectrum data and right channel frequency spectrum data generated in the generating into left channel time series audio data and right channel time series audio data, respectively.

* * * * *